(12) United States Patent
Skene et al.

(10) Patent No.: US 7,441,045 B2
(45) Date of Patent: Oct. 21, 2008

(54) METHOD AND SYSTEM FOR BALANCING LOAD DISTRIBUTION ON A WIDE AREA NETWORK

(75) Inventors: Bryan D. Skene, Seattle, WA (US); Scott P. Tennican, Seattle, WA (US); Thomas E. Kee, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 966 days.

(21) Appl. No.: 09/788,281

(22) Filed: Feb. 16, 2001

(65) Prior Publication Data
US 2001/0052016 A1 Dec. 13, 2001

Related U.S. Application Data

(63) Continuation-in-part of application No. 09/459,815, filed on Dec. 13, 1999, now abandoned.

(60) Provisional application No. 60/227,688, filed on Aug. 24, 2000, provisional application No. 60/182,812, filed on Feb. 16, 2000.

(51) Int. Cl.
G06F 15/173 (2006.01)
G06F 15/16 (2006.01)
(52) U.S. Cl. ................... 709/241; 709/223; 709/201
(58) Field of Classification Search ............. 709/200, 709/223, 229, 228, 241, 201; 712/27; 370/400
See application file for complete search history.

(56) References Cited

U.S. PATENT DOCUMENTS

| | | | |
|---|---|---|---|
| 3,950,735 A | 4/1976 | Patel | 340/172.5 |
| 4,644,532 A | 2/1987 | George et al. | 370/94 |
| 4,965,772 A | 10/1990 | Daniel et al. | 364/900 |
| 5,023,826 A | 6/1991 | Patel | 364/736 |
| 5,053,953 A | 10/1991 | Patel | 364/200 |

(Continued)

FOREIGN PATENT DOCUMENTS

EP 0 744 850 A2 11/1996

(Continued)

OTHER PUBLICATIONS

"A Process For Selective Routing Of Servlet Content To Transcoding Modules," *Research Disclosure 422124*, IBM Corporation, pp. 889-890, Jun. 1999.
"Servlet/Applet/HTML Authentication Process With Single Sign-On," *Research Disclosure 429128*, IBM Corporation, pp. 163-164, Jan. 2000.

*Primary Examiner*—John Follansbee
*Assistant Examiner*—Kristie D Shingles
(74) *Attorney, Agent, or Firm*—Darby & Darby PC; John W. Branch

(57) ABSTRACT

A system and method for balancing the load on virtual servers managed by server array controllers at separate data centers that are geographically distributed on a wide area network such as the Internet is described. The virtual servers provide access to resources associated with a domain name request by a client program. When a Primary Domain Name System (DNS) determined the requested domain name is delegated to a EDNS, the EDNS employs metric information and statistics to resolve an IP address for a virtual server that is selected by the EDNS to optimally balance the load and provide access to resources associated with the domain name. The EDNS may load balance name servers. Additionally, the name server load balancing system may bridge disparate content delivery networks. Internet addresses are divided into geographical information that is used to delegate traffic. Also, metric information is collected and analyzed to help distribute the traffic.

22 Claims, 28 Drawing Sheets

U.S. PATENT DOCUMENTS

| | | | |
|---|---|---|---|
| 5,299,312 A | 3/1994 | Rocco, Jr. | 395/200 |
| 5,327,529 A | 7/1994 | Fults et al. | 395/155 |
| 5,367,635 A | 11/1994 | Bauer et al. | 395/200 |
| 5,371,852 A | 12/1994 | Attanasio et al. | 395/200 |
| 5,406,502 A | 4/1995 | Haramaty et al. | 364/551.1 |
| 5,475,857 A | 12/1995 | Dally | 395/800 |
| 5,517,617 A | 5/1996 | Sathaye et al. | 395/200.1 |
| 5,519,694 A | 5/1996 | Brewer et al. | 370/54 |
| 5,519,778 A | 5/1996 | Leighton et al. | 380/30 |
| 5,521,591 A | 5/1996 | Arora et al. | 340/826 |
| 5,528,701 A | 6/1996 | Aref | 382/178 |
| 5,581,764 A | 12/1996 | Fitzgerald et al. | 395/703 |
| 5,596,742 A | 1/1997 | Agarwal et al. | 395/500 |
| 5,606,665 A | 2/1997 | Yang et al. | 395/200.2 |
| 5,611,049 A | 3/1997 | Pitts | 395/200.9 |
| 5,663,018 A | 9/1997 | Cummings et al. | 430/5 |
| 5,752,023 A | 5/1998 | Chourci et al. | 395/610 |
| 5,761,484 A | 6/1998 | Agarwal et al. | 395/500 |
| 5,768,423 A | 6/1998 | Aref et al. | 382/228 |
| 5,774,660 A * | 6/1998 | Brendel et al. | 709/201 |
| 5,774,668 A * | 6/1998 | Choquier et al. | 709/223 |
| 5,875,296 A | 2/1999 | Shi et al. | 395/188.01 |
| 5,892,914 A | 4/1999 | Pitts | 395/200.49 |
| 5,919,247 A | 7/1999 | Van Hoff et al. | 709/217 |
| 5,936,939 A | 8/1999 | Des Jardins et al. | 370/229 |
| 5,946,690 A | 8/1999 | Pitts | 707/10 |
| 5,949,885 A | 9/1999 | Leighton | 380/54 |
| 5,959,990 A | 9/1999 | Frantz et al. | 370/392 |
| 5,974,460 A | 10/1999 | Maddalozzo, Jr. et al. | 709/224 |
| 5,983,281 A | 11/1999 | Ogle et al. | 709/249 |
| 6,006,260 A | 12/1999 | Barrick, Jr. et al. | 709/224 |
| 6,006,264 A | 12/1999 | Colby et al. | 709/226 |
| 6,026,452 A | 2/2000 | Pitts | 710/56 |
| 6,028,857 A | 2/2000 | Poor | 370/351 |
| 6,051,169 A | 4/2000 | Brown et al. | 264/40.1 |
| 6,078,956 A | 6/2000 | Bryant et al. | 709/224 |
| 6,085,234 A | 7/2000 | Pitts | 709/217 |
| 6,092,178 A * | 7/2000 | Jindal et al. | 712/27 |
| 6,092,196 A | 7/2000 | Reiche | 713/200 |
| 6,108,703 A * | 8/2000 | Leighton et al. | 709/226 |
| 6,111,876 A | 8/2000 | Frantz et al. | 370/392 |
| 6,134,588 A * | 10/2000 | Guenthner et al. | 709/226 |
| 6,173,322 B1 * | 1/2001 | Hu | 709/224 |
| 6,185,619 B1 * | 2/2001 | Joffe et al. | 709/229 |
| 6,205,477 B1 * | 3/2001 | Johnson et al. | 709/220 |
| 6,249,801 B1 * | 6/2001 | Zisapel et al. | 718/105 |
| 6,317,775 B1 * | 11/2001 | Coile et al. | 709/201 |
| 6,324,580 B1 * | 11/2001 | Jindal et al. | 709/228 |
| 6,360,256 B1 | 3/2002 | Lim | 709/223 |
| 6,374,297 B1 * | 4/2002 | Wolf et al. | 709/226 |
| 6,438,133 B1 * | 8/2002 | Ervin et al. | 370/403 |
| 6,446,121 B1 * | 9/2002 | Shah et al. | 709/224 |
| 6,470,022 B1 * | 10/2002 | Rochberger | 370/437 |
| 6,553,413 B1 * | 4/2003 | Leighton et al. | 709/219 |
| 6,553,420 B1 * | 4/2003 | Karger et al. | 709/226 |
| 6,574,229 B1 * | 6/2003 | Takahashi et al. | 370/400 |
| 6,590,861 B1 | 7/2003 | Vepa et al. | 370/216 |
| 6,654,807 B2 * | 11/2003 | Farber et al. | 709/225 |
| 6,901,445 B2 * | 5/2005 | McCanne et al. | 709/225 |
| 7,197,547 B1 * | 3/2007 | Miller et al. | 709/223 |
| 2002/0069416 A1 * | 6/2002 | Stiles | 725/63 |
| 2002/0078233 A1 * | 6/2002 | Biliris et al. | 709/238 |
| 2002/0161835 A1 * | 10/2002 | Ball et al. | 709/203 |
| 2003/0229682 A1 | 12/2003 | Day | 709/219 |
| 2005/0038851 A1 * | 2/2005 | Kriegsman | 709/203 |
| 2005/0193114 A1 * | 9/2005 | Colby et al. | 709/226 |
| 2005/0228856 A1 * | 10/2005 | Swildens et al. | 709/200 |

FOREIGN PATENT DOCUMENTS

| | | |
|---|---|---|
| WO | WO 91/14326 | 9/1991 |
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

* cited by examiner

*Separate Primary DNS and EDNS*

Primary DNS includes Primary EDNS at multiple locations

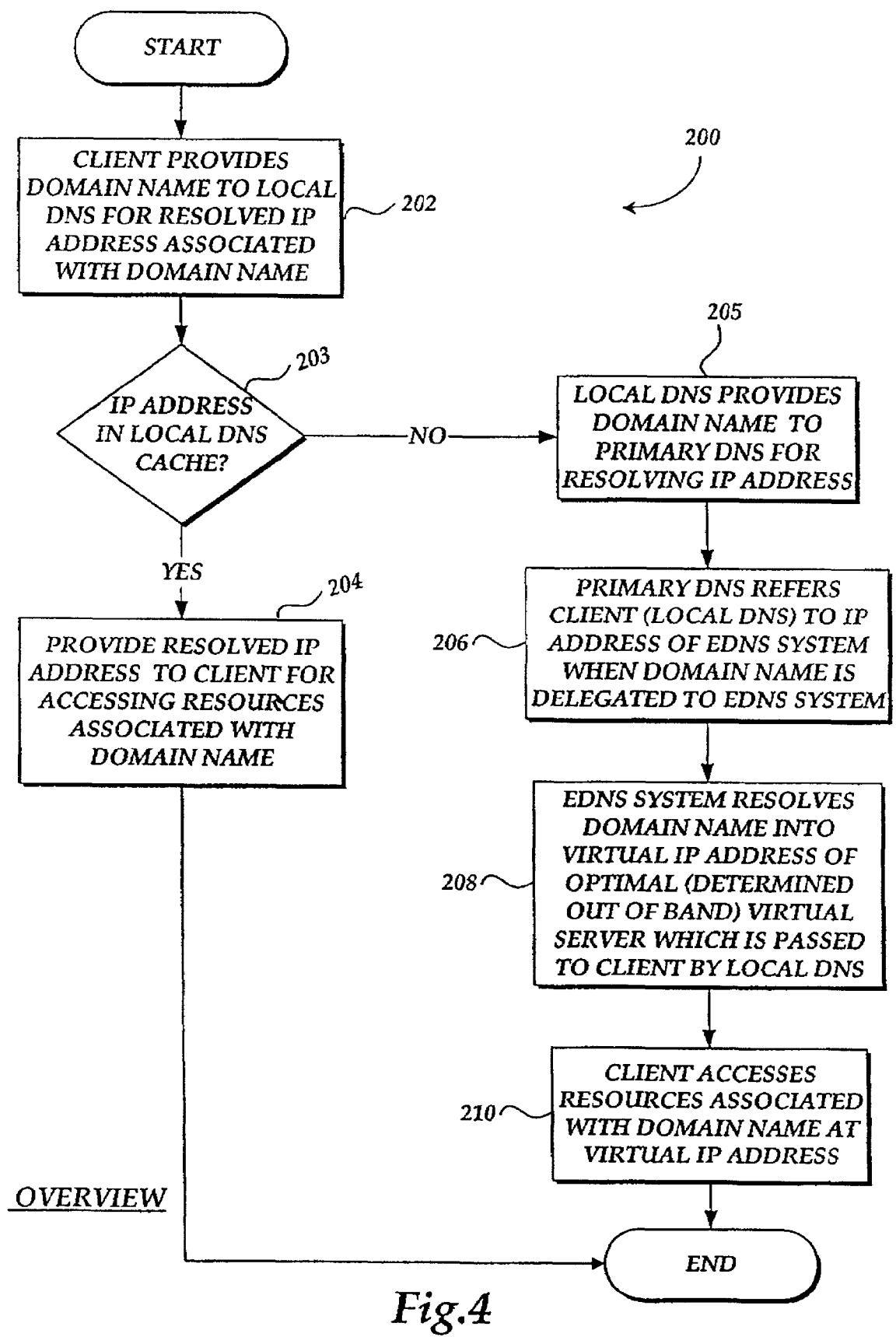

*Separate Primary DNS and EDNS*

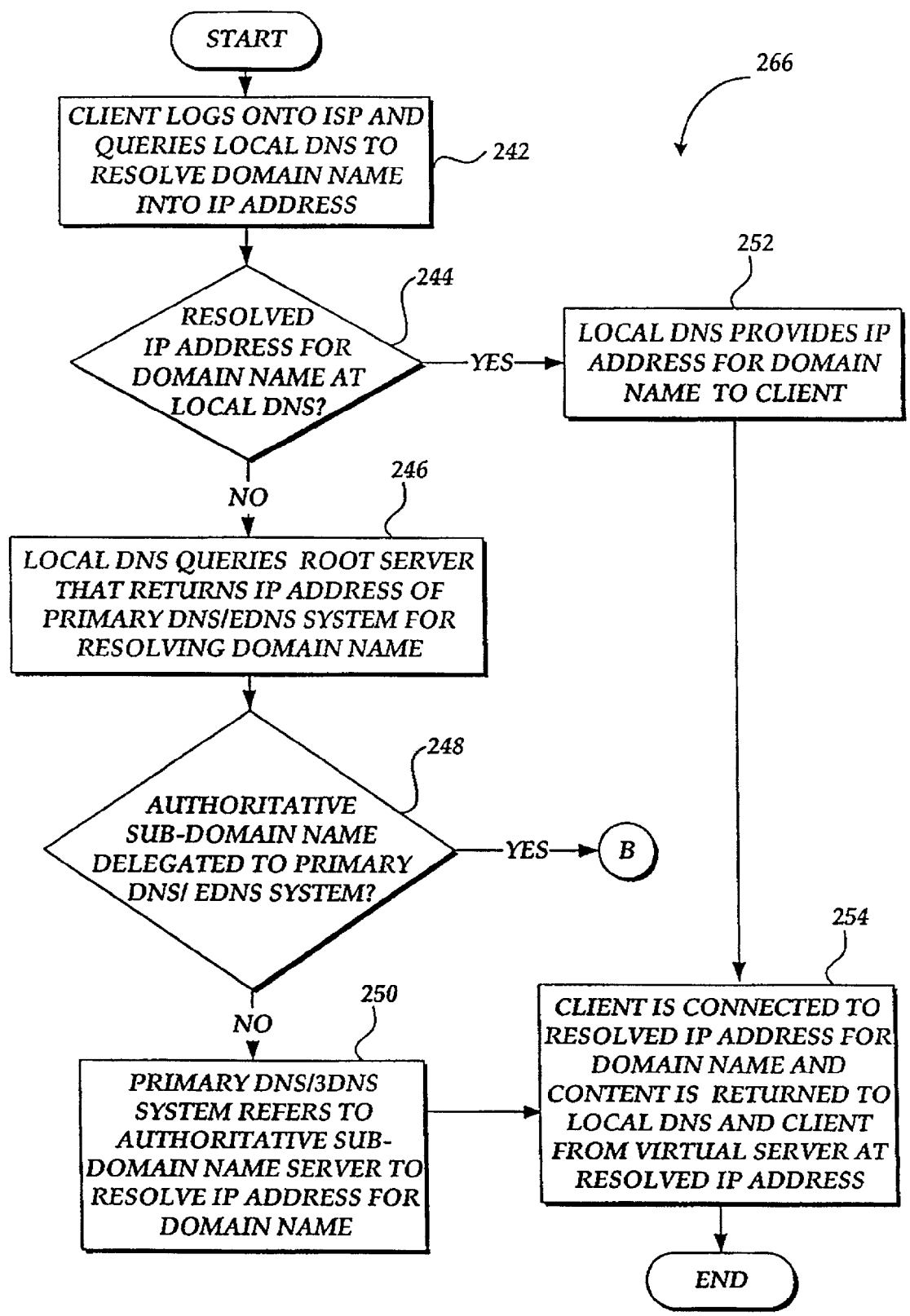
Fig.6A  *Primary DNS includes 3DNS*

```
TOPOLOGY     {                                              374
   ACL_THRESHOLD    1
   LIMIT_PROBES     YES
   LONGEST_MATCH       YES
   // SERVER/MASK (BIG/IP)        LDNS/MASK          SOURCE

// NORTH AMERICA DOESN'T GO TO THE SOUTH AMERICA DATA CENTER
       200.107.34.0/24            198.0.0.0/8           0
       200.107.34.0/24            199.0.0.0/8           0

// SOUTH AMERICA DOESN'T GO TO THE NORTH AMERICA DATA CENTER
       199.5.23.0/24              200.0.0.0/8           0
       199.5.23.0/24              201.0.0.0/8           0
}
```

*Fig.13*

```
TOPOLOGY SCORE      {
                                                            376
   // SERVER/MASK (BIG/IP)     LDNS/MASK          SCORE
   /*** NY Office ***/

/* NY Office --> NJ (high score) */
       209.67.0.0/16            207.25.53.0/24       100

/*** Brazil ***/

/* Brazil --> Brazil (high score) */
       200.211.0.0/16           200.255.0.0/16       100

/* Brazil --> Argentina (low score) */
       63.65.0.0/16             200.255.0.0/16       5

/* Brazil --> New Jersey (low score) */
       209.67.0.0/16            200.255.0.0/16       5

/* Brazil --> New York (low score) */
       167.216.0.0/16           200.255.0.0/16       5
}
```

*Fig.14*

METHOD AND SYSTEM FOR BALANCING LOAD DISTRIBUTION ON A WIDE AREA NETWORK

RELATED APPLICATIONS

This utility patent application is a continuation-in-part of U.S. patent application, U.S. Ser. No. 09/459,815 filed Dec. 13, 1999, now abandoned, and a continuation of previously filed U.S. Provisional Patent Applications, U.S. Ser. No. 60/182,812 filed Feb. 16, 2000, and U.S. Ser. No. 60/227,688 filed Aug. 24, 2000, the benefit of the filing dates of which are hereby claimed under 35 U.S.C. 119(e).

FIELD OF THE INVENTION

This application relates generally to distributing the load demand between servers on a network, and, more specifically, to bridging content delivery across multiple CDNs.

BACKGROUND OF THE INVENTION

In the past, a wide area network (WAN) of geographically distributed servers for data centers and Internet sites were more susceptible to reliability, inconsistent performance, and scalability issues than a network of local servers. Also, balancing the load demand between geographically distributed servers for web-based applications and content such as email and streamed multimedia data has proven to be difficult for several reasons.

One reason is that when a geographically distributed server fails, there has not been a facility for automatically redirecting client requests to another server that could also fulfill the client's request.

Another reason is that adding and/or removing servers from a geographically distributed network has proven to be difficult. Also, methods for balancing the load between geographically distributed servers have not employed intelligent algorithms for automatically connecting a client to the server that can optimally fulfill the request.

SUMMARY OF THE INVENTION

The present invention is directed at providing a system and method for load-balancing servers on a network.

According to one aspect of the invention, a name server load-balancing system is directed at bridging disparate CDNs for content providers (CP) by load-balancing name servers using load-balancing addresses methodologies.

According to another aspect of the invention, geographic criteria metric information is collected and stored that is used to segment IP addresses into physical locations. For example, local DNS servers can be classified to the continent or country level, segmenting North American traffic and non-North American traffic.

According to another aspect of the invention, a threshold limitation for virtual servers is provided that allows an EDNS to route traffic to another server when the threshold limitation is reached.

According to yet another aspect of the invention, a last-resort pool may be used when the other pools contain no available resources, regardless of the pool load-balancing mode. A last-resort pool may be used for many different reasons. For example, the last-resort pool may be used if the other pools have a flow rate that has exceeded a user defined limit or threshold.

According to a further aspect of the invention, a load-balancing method, known as VSCAPACITY is included that accounts for computing power behind a wide area virtual server. This mode may take into account many different capacity variables, including: number of nodes up, packet flow, connections per VS, and the like.

Still yet another aspect of the invention provides a system where EDNS controllers respond differently to local DNS servers based on their geographic attributes. This helps users to keep in closer contact to the geographically closest data center without requiring the EDNS to collect and utilize metrics such as RTT.

Another aspect of the invention, determines when a KBPS limit has been exceeded.

Another aspect of the invention, a disaster recovery for a site is used. According to this particular aspect, a policy can be set that specifies that all traffic be sent to the primary site, but only if it is performing correctly.

BRIEF DESCRIPTION OF THE DRAWINGS

FIG. 4 illustrates an overview of the main logic flow of one-embodiment of the present invention;

FIGS. 6A and 6B illustrate the logic flow for a Primary DNS that includes an EDNS system;

FIG. 13 shows an exemplary topology statement for use with a topology load-balancing method;

FIG. 14 shows an exemplary topology score statement for use with a Quality of Service load-balancing method;

DETAILED DESCRIPTION OF THE PREFERRED EMBODIMENT

Figure 1:
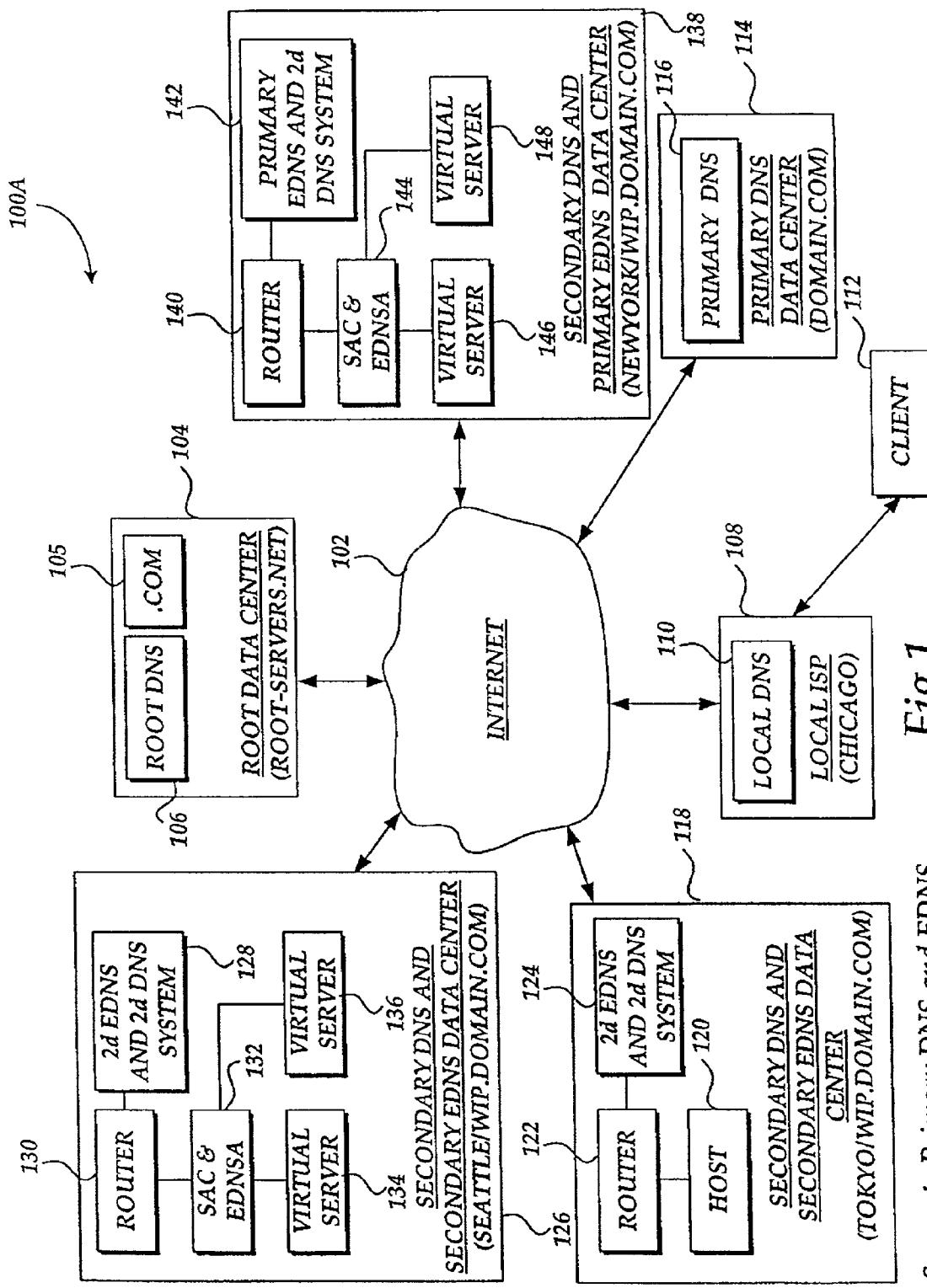
FIG. 1 illustrates an overview of the system architecture for implementing the present invention with a separate Primary DNS and a separate EDNS system.

The present invention provides a method for optimizing the accessibility and availability of data on a scaleable, fault tolerant wide area network (WAN). In accordance with this invention, any one of several different types of load-balancing methods can be employed to analyze metric information and optimally balance client requests (load demand) between redundant geographically distributed virtual servers. These load-balancing methods include RTT (round trip time), RR (round robin), least connections, packet completion rate, quality of service, server array controller packet rate, topology, global availability, hops, static ratio, time of day, operating conditions, and dynamic ratio. The metric information can be used by the present invention to determine an optimal load-balancing method and generate statistics. Prior to describing the invention in greater detail, a list of particular terms and their definitions is provided below.

Definition of Terms

Virtual server array Controller—A virtual server array controller (SAC) manages and balances network traffic on an intranet. One embodiment of a SAC is the "BIG-IP" server array controller produced by F5 Networks, Incorporated of Seattle, Wash. The SAC intelligently distributes site connections across arrays of servers, transparent firewalls, transparent cache servers, routers as well as other router-like devices. The SAC is designed to manage connections to multiple Internet or intranet sites, and it supports a wide variety of Internet protocols and services such as TCP/IP and HTTP. Also, the SAC monitors several aspects of the node servers that deliver content associated with a domain name.

Content Delivery Network—A content delivery network (CDN) infrastructure generally attempts to move content, as close as possible to end users prior to users accessing the content resulting in faster content delivery for the user. A CDN may consist of any infrastructure, bandwidth, people, or other resources, which help deliver content from servers to clients. A CDN may also be the authoritative DNS for a domain.

Virtual Server—A specific combination of a virtual IP address and a virtual port number on a SAC or a Host machine. The controller or Host machine manages access to the virtual server.

Node Server—A specific combination of a node address and a node port number on an intranet behind a SAC. The SAC manages the node servers and maps each virtual server to one or more node servers.

Host machine—Can be a single network server or a SAC for managing multiple servers.

Domain Name System (DNS)—A distributed database that maps host names to Internet protocol (IP) addresses. A DNS server is used to resolve host names associated with IP addresses.

Primary Extended Domain Name system (EDNS) Server—A Primary EDNS server collects metric information for virtual servers that are managed by a SAC. One embodiment of the Primary EDNS server is a 3-DNS server produced by F5 Networks, Incorporated of Seattle, Wash. On a wide area network, all EDNS servers are peers and each Primary EDNS server monitors and collect data (metric information) for each virtual server that is managed by a SAC. Based on configuration information, the Primary EDNS server determines the virtual servers that are associated with a particular name or service. Typically, an EDNS server is designated as a Primary or Secondary system using a global sub-statement, i.e., primary_IP. The Primary EDNS server employs the collected metric information to determine the virtual address for a virtual server that will balance the load caused by a request for access to resources associated with a domain name (IP address).

Secondary Extended Domain Name System (EDNS) Server—A Secondary EDNS server can copy metric information from a Primary EDNS server at defined intervals that are specified with a global sub-statement, e.g., sync db interval. One aspect of the Secondary EDNS server is that it can copy metric information from a Primary EDNS server and does not have to independently collect this information. The Secondary EDNS server employs the copied metric information to determine the virtual address for a virtual server that will balance the load caused by a request for access to resources associated with a domain name (IP address). However, the Secondary EDNS server can also collect the metric information separately from the Primary ENDS server. Also, one embodiment of the Secondary EDNS server is produced by F5 Labs, Incorporated of Seattle, Wash.

Primary or Authoritative DNS (zone) Server—A Primary DNS server is an authoritative source for zone information related to the name suffix, e.g., ".com" and ".net". All DNS servers can resolve names, but zone files are only configured and kept by the Primary DNS server. An authoritative DNS may find a data center with CDN resources at the edge of the network that is closest to the client.

Secondary DNS Server—A Primary DNS server instructs each Secondary DNS server when it should get its database from the Primary DNS server on a zone-by-zone basis. The Secondary DNS may copy zone files from the Primary DNS server when it starts up, when a timer expires in a Start of Authority (SOA) record, or when a dynamic update has occurred to the zone file. The SOA record is a resource record used to define a zone. Zone files are the database of DNS and these resource records, in a hierarchical structure, make up the DNS.

Local DNS—A DNS server that makes name resolution requests on behalf of a client. Also, from the EDNS systems' perspective, the local DNS is the source of a name resolution request.

End-point—The item, e.g., a virtual server, which is controlled by the SAC or Host machine that the Primary EDNS server is monitoring. For a SAC, the end-point is any virtual server that is managed by the SAC. When the Primary EDNS server collects information from a Host machine, the endpoint is the IP address of the virtual server.

iQuery Protocol—A UDP-based protocol that is used to communicate and exchange information between SACS and EDNS servers. For example, a Primary EDNS server will send iQuery questions to a SAC via port 245 or 4353. The iQuery protocol is officially registered with the IANA for port 4353, and iQuery can run on either that port or on the original port 245. A SAC reply is returned through a local ephemeral port which is randomly assigned by the Primary EDNS server or alternatively either port 245 or 4353 as a single port for return iQuery traffic; and iQuery can be set to include translated IP addresses in iQuery packets (useful for configurations where iQuery communication between a SAC and a EDNS system passes through a firewall). Additionally, the iQuery communication may be encrypted.

Extended Domain Name System Agent (EDNSA)—A client (agent) program that can run on a SAC or EDNS server and answer queries from every EDNS server on a network. The EDNSA client may also be a stand-alone system that communicates with a SAC, EDNS and a Host machine. One embodiment of the EDNSA is a BIG/3D client program produced by F5 Networks, Incorporated of Seattle, Wash.

Wide IP—A Wide IP statement is used to map a domain name to a set of virtual servers managed by SACs or other Host machines. Also, the Wide IP statement may be used to map a domain name to a load-balancing mode that is performed by a EDNS server. The Wide IP statement includes a Wide IP key, which is the same IP address as specified by the domain name's "A" resource record in the zone file. Alternatively, the Wide IP key could be employed to bind the information from the DNS servers to the EDNS system and indicates to the DNS servers that the EDNS system (within the named process) should attempt to handle requests to the domain name. In this way, the EDNS system resolves a request by making a decision based upon its metric information database and returns an answer to a client domain name request. When the preferred, alternate and fall back load-balancing methods in a Wide IP system fails, the EDNS system instructs the DNS to reissue its original answer. When this event occurs, the Wide IP key is relied upon as the fall back address.

Time to Live (TTL)—Each TTL variable is used to control how long information is saved in a particular cache that a server uses to make decisions. There are two important TTL values that affect decisions made by an EDNS system, i.e., zone minimum TTL variables and object limit TTL variables. A zone minimum TTL variable contains a field for each resource record in a zone file. Each EDNS object has an associated TTL object limit variable associated with metric information. When a TTL object limit variable expires, the EDNS system will stop using a dynamic load-balancing method and revert to a static method. Internet Service Provider (ISP)—A client accesses resources on a WAN through a local ISP. The client may connect to the local ISP through a telephone modem, cable modem and/or satellite connection. The Local ISP usually provides a local DNS service that communicates with other servers on the WAN for resolving a domain name request into an IP address.

Hops—An intermediate connection in a string of connections linking two network devices. On the Internet, for example, most data packets go through several intermediate systems (routers, Host machines, switches, or layer 3 network device) before they reach their final destination. A hop is defined as a stop at an intermediate system (IS) for evaluation and then forwarded on to the next IS known to the current IS. Each time the packet is forwarded, a hop occurs. Generally, the more hops, the longer it takes for data to go from source to destination The number of hops a packet takes to get to another Internet host can be measured by using a trace route utility. A contiguous network may have fewer intermediate hops and may enable a packet to be transferred faster than a non-contiguous network. Theoretically, the fewer hops it takes to get a packet onto the Internet backbone, the faster access will be for a client. A raw hops variable would include all of the IP addresses that passed on the packet from the source to its destination. A hops variable could also indicate how much of the time the packet was passed on by a continuous network from the source to its destination. A packet transfer tends to be faster and more reliable on continuous networks.

System Architecture

FIG. 1 illustrates an overview 100A of an embodiment of a WAN architecture that includes the present invention added to a network that includes a Primary DNS server for resolving IP address associated with a domain name request. At least one separate Primary EDNS server may be used as the authoritative source for a sub-domain name. Also, separate Secondary EDNS servers may be provided at geographically distributed locations where they receive copies of metric information that is collected by the Primary EDNS server. The transaction process for this embodiment of the present invention begins with a request from a client 112 for resources associated with a domain name, e.g., www.domain.com. The client communicates the domain name request to a local ISP 108 that provides a local DNS server 110 for resolving the domain name request into an IP address associated with the requested domain name. In this example, the local ISP 108 is a separate computer system that may provide other types of services to the client 112 such as e-mail and web page hosting. The local ISP 108 will pass a client's domain name request to the local DNS server 110 to determine if the requested information resides in its cache. If so, the local DNS server 110 will provide the resolved IP address associated with the requested domain name to the client. If the resolved IP address does not reside in the cache for the local DNS server, the local DNS will communicate through the Internet 102 with a data center 104 that supports a root DNS server 106, i.e., a DNS server associated with the domain name "root-servers.net." The root DNS server 106 analyzes the client's domain name request ("www.domain.com") and passes this request to a ".com" DNS server 105 that assists in resolving IP addresses associated with domain names that have the ".com" suffix. The ".com" DNS server returns to the local DNS server 110 an IP address for another data center 114 that supports a Primary DNS server 116 that is an authoritative source for zone information related to "domain.com." The Primary DNS server 116 refers the local DNS server 110 to an authoritative sub-domain server for resolving the actual IP address associated with the client's domain name request. In this example, the Primary DNS server 116 refers the local DNS to the Wide IP address of a Primary EDNS server 142 supported by a data center 138 located in New York, N.Y. (newyork/wip.domain.com), because this EDNS server is designated as the WAN's authoritative source for this sub-domain name. At the data center 138, a router 140 is coupled between the Internet 102 and the Primary EDNS server 142 and a SAC 144. The SAC manages communication with a pair of redundant node servers 146 and 148. Also, for the requested domain name, the Primary DNS server 116 will create a public alias (CNAME) name for a name in the sub-domain that is delegated to the Primary EDNS server 142. Next, the local DNS 110 will query the Primary EDNS server 142 at the Wide IP address to resolve an IP address associated with the client's domain name request. The Primary EDNS server 142 will determine a Wide IP address for a selected end point that is best suited to respond to the domain name request and returns this determined Wide IP address to the client 112. For the purposes of this example, the Primary EDNS server 142 has selected an end-point at another data center 126 located in Seattle, Wash. (seattle/wip.domain.com) that includes a Secondary EDNS server 128 in communication with a SAC 132 and a router 130 which provide access to other servers and services connected to the Internet 102. The SAC 132 includes an EDNSA program that provides metric information to the Primary EDNS server when it receives an iQuery protocol request. When the time to live (TTL) value for a determined Wide IP address is set to a relatively short period of time, the Local DNS will come back to the Primary EDNS each time to resolve a domain name and the load on the EDNS system is high because it must determine the optimal virtual server for each domain name request. Conversely, when the time to live (TTL) value for a determined Wide IP address is a relatively long period of time, the Local DNS does not have to come back to the Primary EDNS each time to resolve a domain name and the load on the EDNS system will be low. Lastly, the client 112 connects to the selected end-point at the determined Wide IP address, which is also the virtual address assigned to one of the redundant node servers 134 and 136 that are managed by the SAC 132. Once the connection is made to the selected end-point, the client may access resources that are associated with the domain name.

Figure 2:
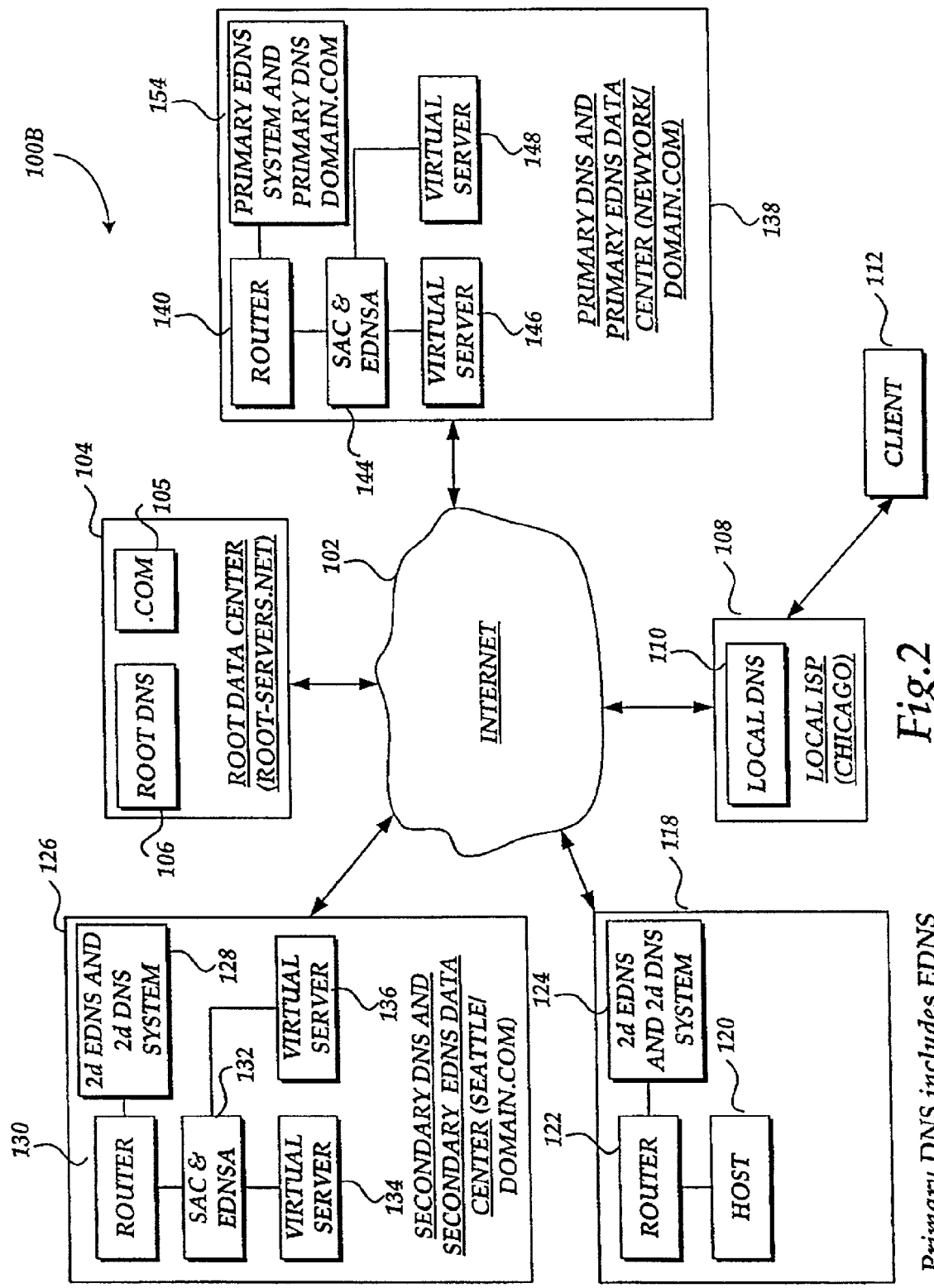
FIG. 2 shows an overview of the system architecture for implementing the present invention with a Primary DNS that includes an EDNS system.

FIG. 2 illustrates an overview 100E of another embodiment of a WAN architecture that is similar to the network architecture shown in FIG. 1. In this case, the Primary DNS server also includes a local Primary EDNS server that is an authoritative source for the sub-domain name ("domain.com") associated with the client's domain name query. The transaction process is similar to the steps discussed above for FIG. 1 until the local DNS server 110 connects to the data center 138 that includes Primary DNS and Primary EDNS servers 154 in the same system. In this configuration, the Primary EDNS server will handle the resolution of the client's domain name request by sending an IP address to the local DNS server 110 for the optimal virtual server to provide the client with access to resources associated with the domain name. The local DNS server 110 passes the resolved IP address to the client 112, which connects to the selected end-point at the IP address of a geographically distributed data center 126, e.g., seattle/domain.com. The client 112 uses the resolved IP address to connect through the ISP 108 to the selected end-point (virtual server) at the data center 126 in Seattle, Wash.

Figure 3A:
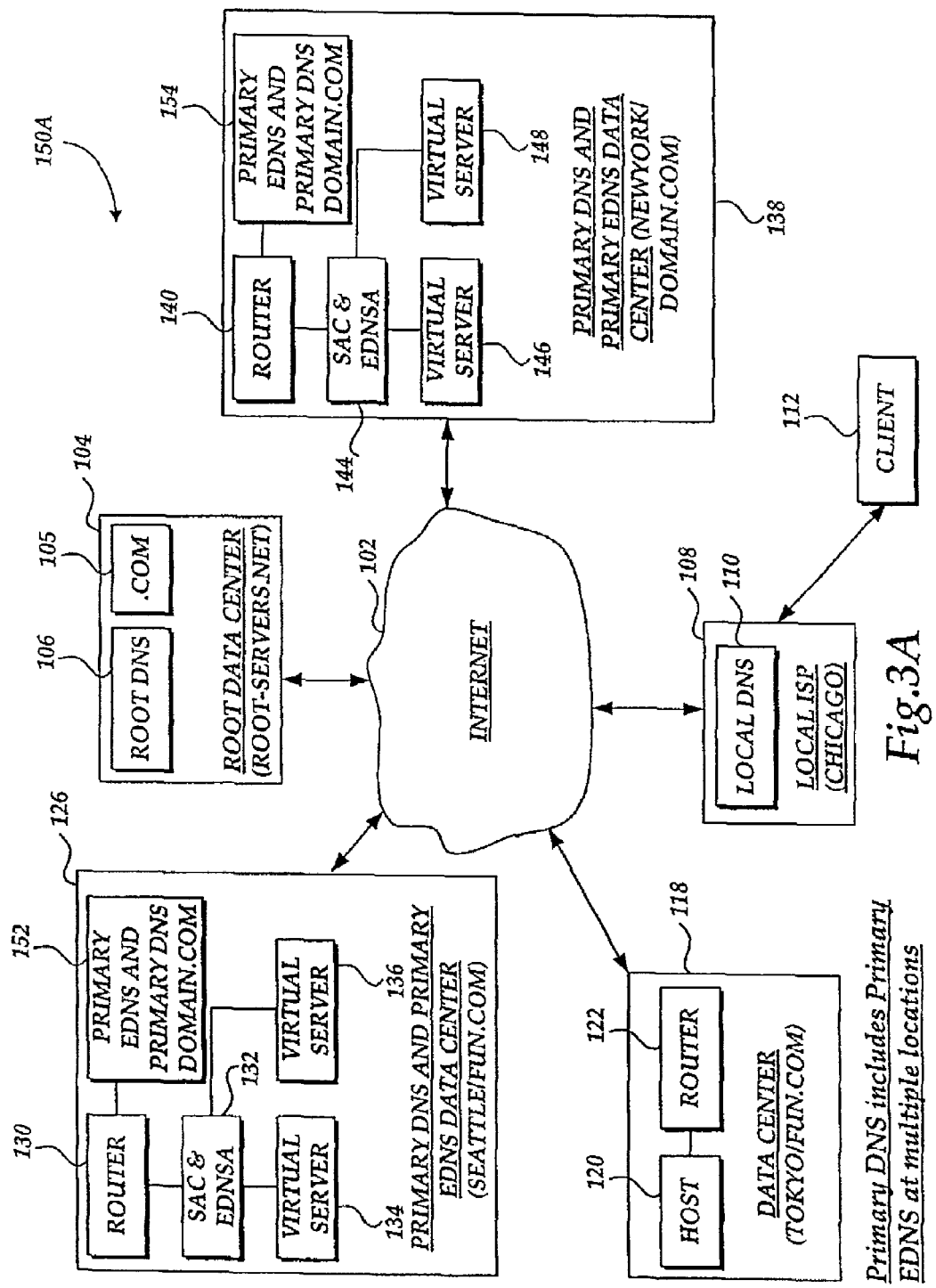
FIG. 3A illustrates an overview of the system architecture for implementing the present invention with a Primary DNS that includes a Primary EDNS system at multiple locations.

In FIG. 3A, an overview 150B is shown of another embodiment of a WAN architecture that is somewhat similar to the network architecture shown in FIG. 2 except that it includes multiple Primary DNS and Primary EDNS servers in separate geographically remote data centers. The transaction process is similar to the steps discussed above for FIG. 2 except that each Primary EDNS server separately collects metric information out of band and each Primary DNS server is an authoritative source for zone information. At the data center 126 disposed in Seattle, Wash. (seattle/domain.com), Primary EDNS and Primary DNS servers 152 are included in the same system. Also, Primary EDNS and Primary DNS servers 154 are included in the data center 138 located in New York, N.Y. (newyork/domain.com). Both of these Primary DNS servers are authoritative sources for zone information that is used to resolve the client's domain name request. Each Primary EDNS system uses its separately collected metric information to perform the selected load-balancing method and determine (resolve) an IP address for the client to optimally access resources associated with the requested domain name. Additionally, only one Host machine 120 is shown disposed at the data center 118 located in Tokyo, Japan (tokyo/domain.com).

Figure 3B:
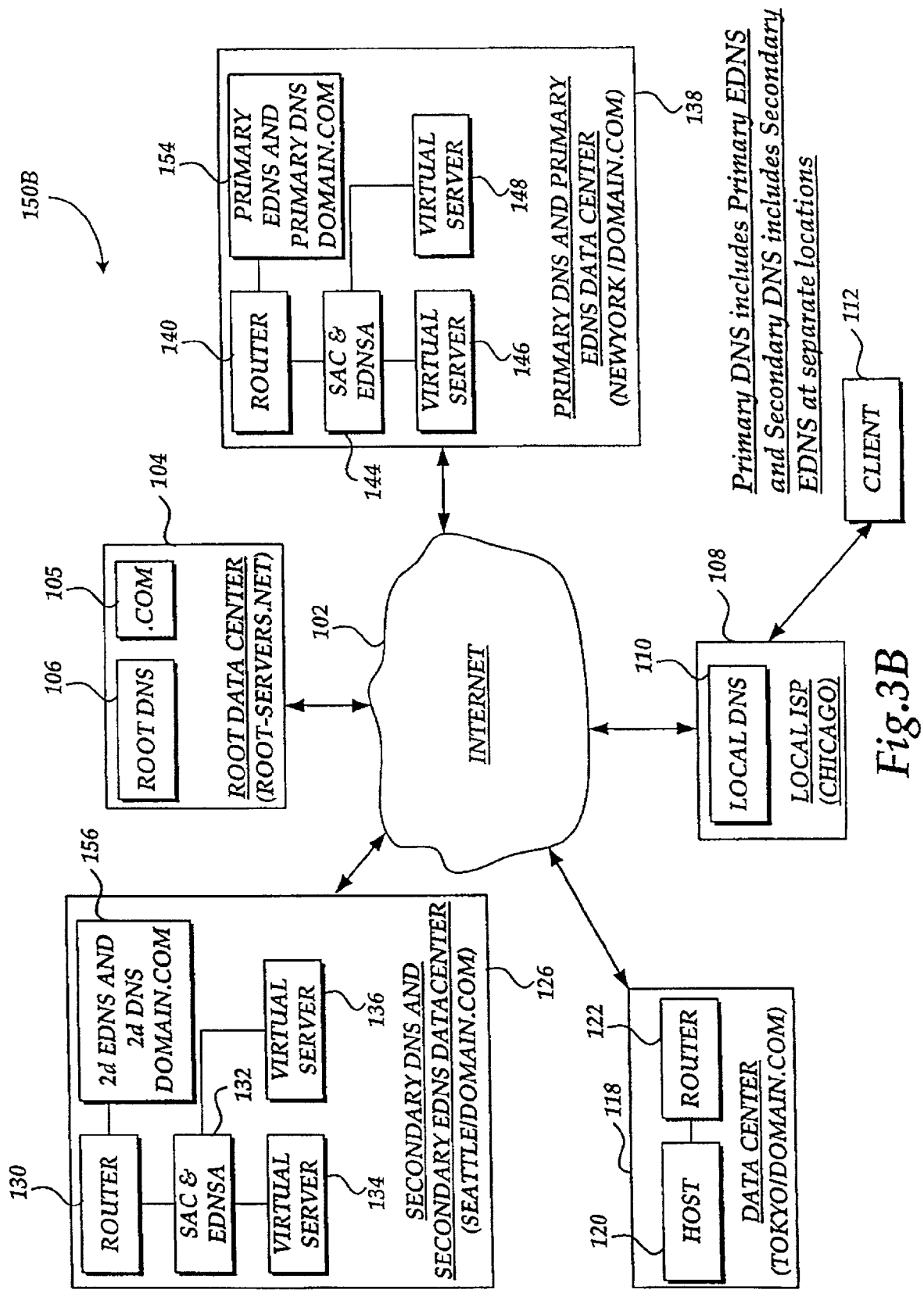
FIG. 3B shows an overview of the system architecture for implementing the present invention with a Primary DNS that includes a Primary EDNS system and a Secondary DNS that includes a Secondary EDNS at separate locations.

FIG. 3B illustrates an overview 150B of another embodiment of a WAN architecture that is somewhat similar to the network architecture shown in FIG. 3A except that it includes Secondary DNS and Secondary EDNS servers in a data center that is geographically separate from another data center that includes Primary DNS and Primary EDNS servers. The transaction process is similar to the steps discussed above for FIG. 3A except that only the Primary EDNS server is collecting the metric information out of band from the SACs and other Host machines. At the data center 126 disposed in Seattle, Wash. (seattle/domain.com), Secondary EDNS and Secondary DNS servers 156 are included in the same system. The Secondary EDNS server receives a copy of the metric information from the Primary EDNS server at specified intervals so that the Secondary EDNS server can use the selected balancing method to determine (resolve) an IP address for the optimal virtual server and provide access to resources associated with the client's domain name request. Additionally, the Secondary EDNS server receives zone information from the Primary DNS server at the data center 138 located in New York, N.Y.

Figure 3C:
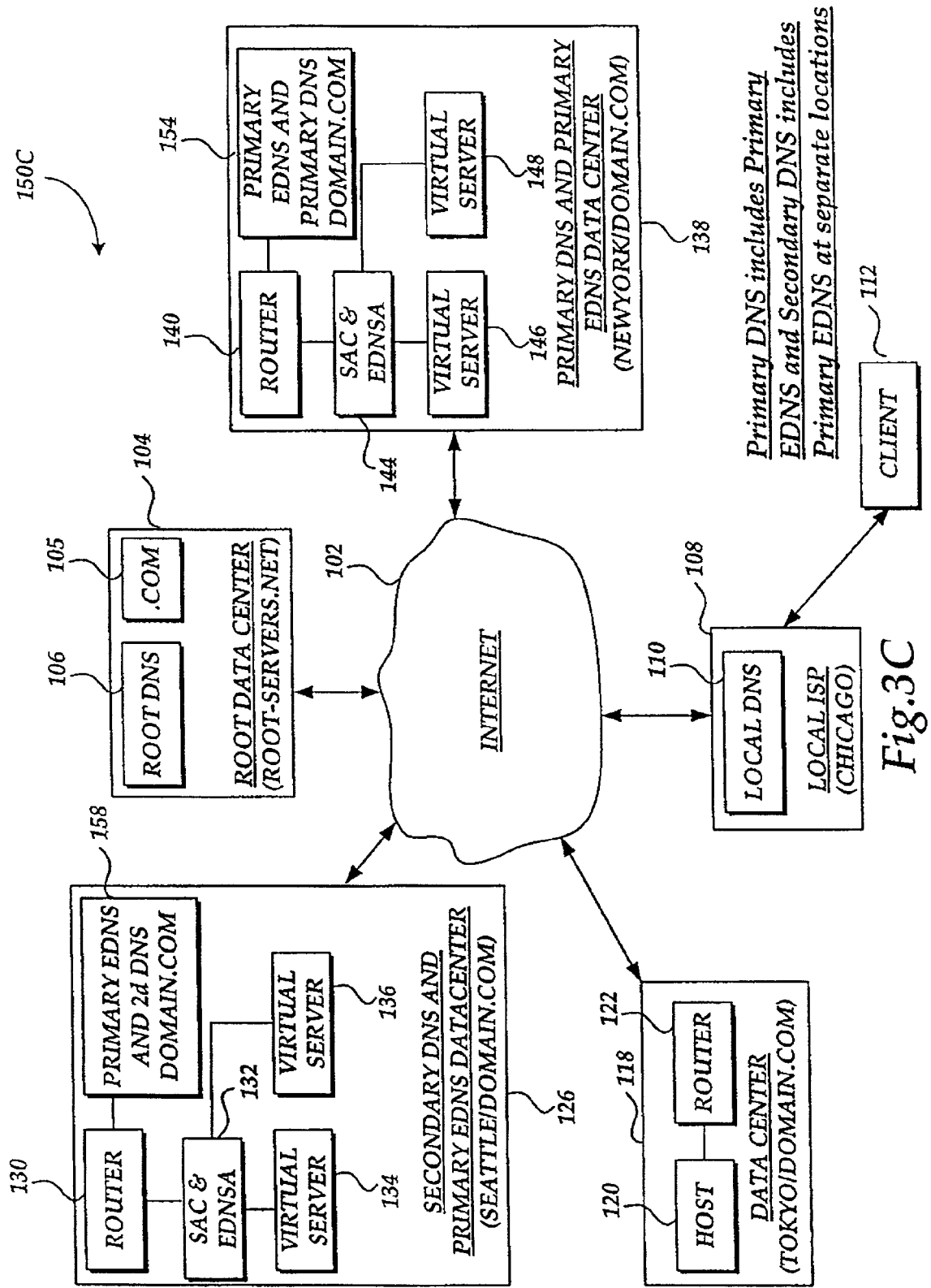
FIG. 3C illustrates an overview of the system architecture for implementing the present invention with a Primary DNS that includes a Primary EDNS system and a Secondary DNS that includes a Primary EDNS at separate locations.

FIG. 3C illustrates an overview 150C of another embodiment of a WAN architecture that is somewhat similar to the network architecture shown in FIG. 3B except that it includes a Secondary DNS server and a Primary EDNS server in the Seattle data center 126 which is geographically separate from the New York data center 138 which includes a Primary DNS server and a Primary EDNS server. The transaction process is similar to the steps discussed above for FIG. 3B except that the Primary EDNS server in the Seattle data center 126 collects metric information separately from the collection of metric information by the Primary EDNS server in the New York data center 138. The Primary EDNS server in the Seattle data center 126 uses its separately collected metric information to perform the selected balancing method and determine (resolve) an IP address for the optimal virtual server. Additionally, the Primary DNS server in the New York data center 138 provides the zone information to the Primary EDNS server in the Seattle data center 126.

Figure 3D:
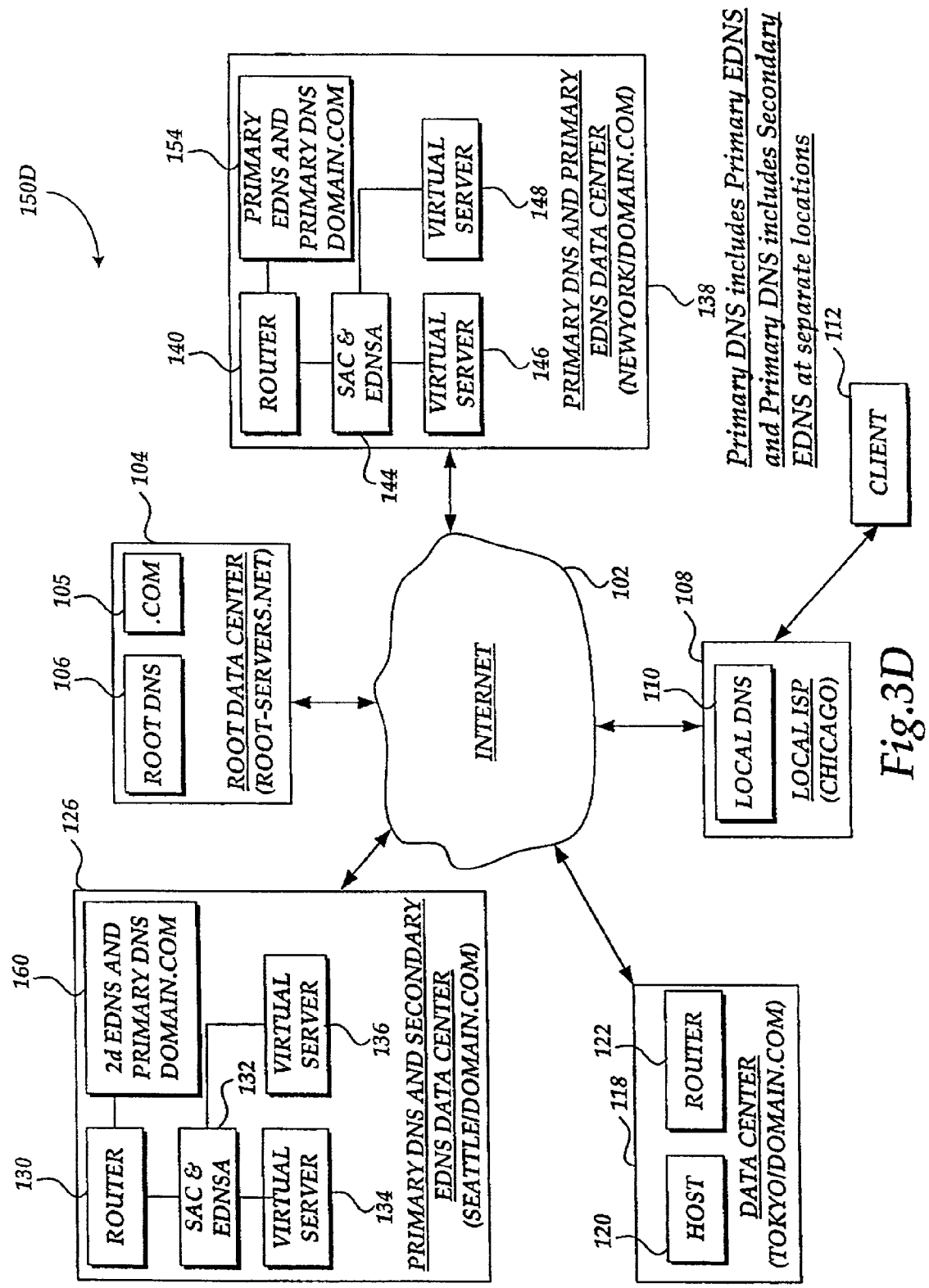
FIG. 3D shows an overview of the system architecture for implementing the present invention with a Primary DNS that includes a Primary EDNS system and a Primary DNS that includes a Secondary EDNS at separate locations.

FIG. 3D illustrates an overview 150D of another embodiment of a WAN architecture that is somewhat similar to the network architecture shown in FIG. 3A except that it includes a Secondary EDNS server and a Primary DNS server in the Seattle data center 126 which is geographically separate from the New York data center 138 which includes a Primary DNS server and a Primary EDNS server. The transaction process is similar to the steps discussed above for FIG. 3A except that only the Primary EDNS server in the New York data center 138 is collecting metric information, which is copied, to the Secondary EDNS server in the Seattle data center 126. Also, the Primary DNS servers in the Seattle data center 126 and the New York data center 138 are authoritative sources for zone information that is used to resolve the client's domain name request. The Primary and the Secondary DNS servers for a zone can give authoritative answers. However, the Primary DNS server maintains the zone files and the Secondary DNS server stores a copy of the zone files.

Figure 3E:
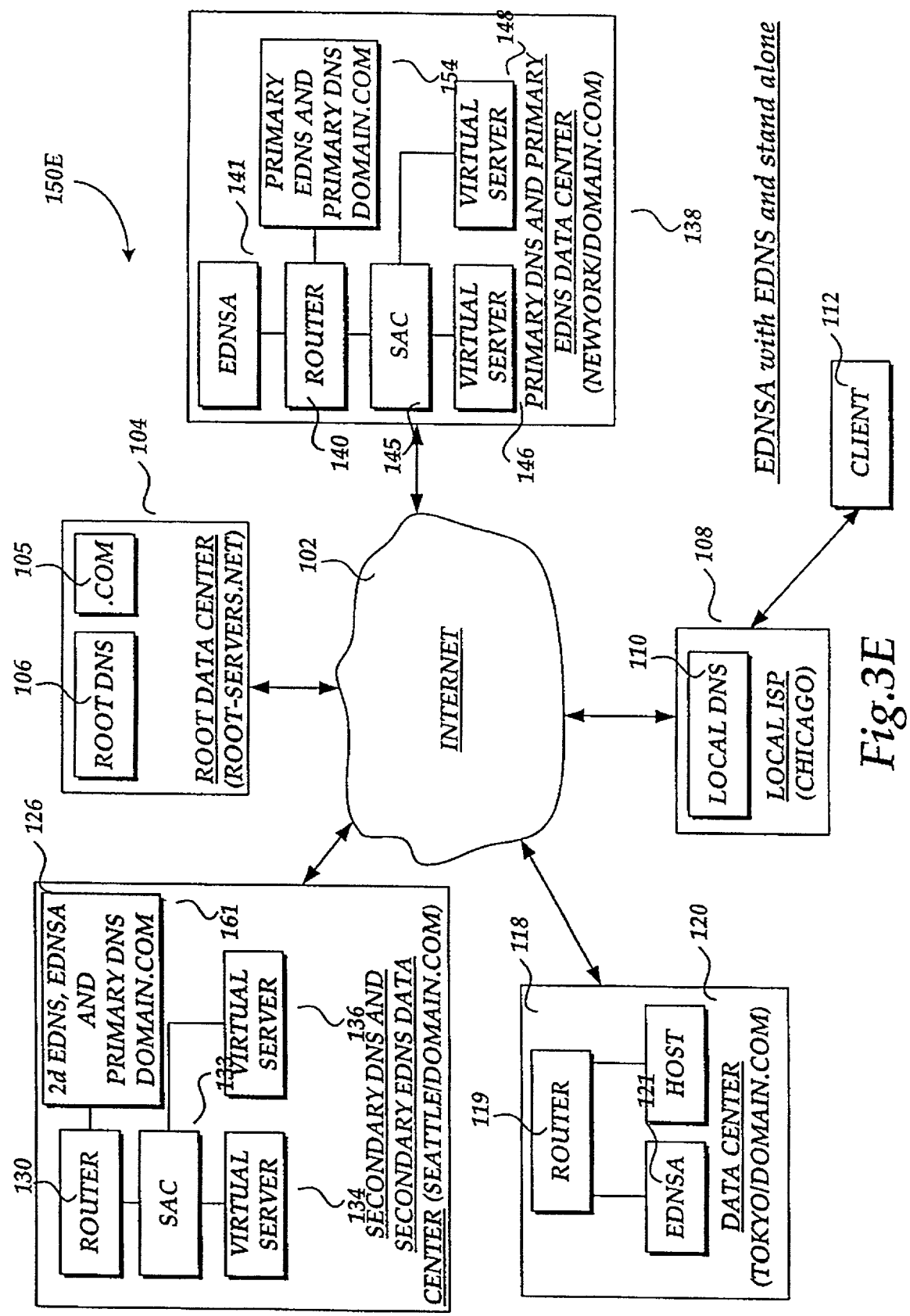
FIG. 3E shows an overview of the system architecture for implementing the present invention with stand-alone EDNSA programs and a EDNSA program included with a Secondary EDNS at separate locations.

FIG. 3E illustrates an overview 150E of another embodiment of a WAN architecture that is somewhat similar to the network architecture shown in FIG. 3D except that the EDNSA programs are no longer included with the SACs. Instead, one of the EDNSA programs is included with a Secondary EDNS server and a Primary DNS server in a system 161 that is located in the Seattle data center 126. Also, the New York data center 138 includes a stand-alone EDNSA program 141 and the Tokyo data center 118 includes another stand-alone EDNSA program 121. The transaction process for this embodiment is similar to the steps discussed above for FIG. 3D except that the EDNSA programs do not run on the SACS. In this embodiment, since the EDNSA program is employed in a stand-alone system or implemented with a EDNS server, the processing load on the SAC is reduced. Also, the stand alone EDNSA program 121 (parent) located in the Tokyo data center 118 can locally obtain metric information from the Host machine 120 (non-BIG/ip) with a Simple Network Management Protocol reader (SNMP child factory). The Primary EDNS server can collect this information at specific intervals. In FIGS. 1 through 3E, each embodiment shows the Internet 102 used to connect the local DNS 110 with other resources/servers on a publicly administered WAN. It is envisioned that the present invention may also be used with an intranet and a privately administered WAN. Resolving it) address for a Domain Name.

FIG. 4 illustrates a general overview 200 of the main logic flow of the present invention. Moving from a start block, the logic flows to a block 202 where the client communicates a domain name request to a local DNS server in the data center of a local ISP. The client may communicate with the local ISP through any one of several different devices, including a cable modem, a wireless modem, a telephone modem and a network interface card (NIC) on an intranet that is in communication with the local ISP. In response to the domain name request, the local DNS tries to provide the client with a resolved IP address from a local cache of resolved IP addresses. Stepping to decision block 203, when the resolved IP address for the requested IP address is in the local cache of the local DNS server, the logic advances to a block 204 and this address will be provided to the client. The client uses the provided IP address to access resources associated with the domain name. Next, the logic moves to the end block and terminates. However, if the determination at decision block 203 is false, the logic flows to block 205 and the local DNS server provides the requested domain name to the Primary DNS server for resolving into an IP address. At block 206, when the domain name is delegated to an EDNS server, the Primary DNS server refers the local DNS server to the EDNS's IP address. At block 208, the EDNS system resolves the requested domain name into a virtual IP address for a determined virtual server and passes this IP address through the local DNS server to the client. The EDNS server employs at least one load-balancing method to determine the optimal virtual server to provide the client with access to resources associated with the domain name. The EDNS server collects metric information used for the load-balancing determination at specified intervals out of band, i.e., a separate process is started to provide the metric information at regular intervals. Flowing to a block 210, the client connects to the optimally determined virtual server at the virtual IP address and accesses resources associated with the requested domain name. Next, the logic steps to the end block and the main logic 10 flow terminates.

Figure 5A:
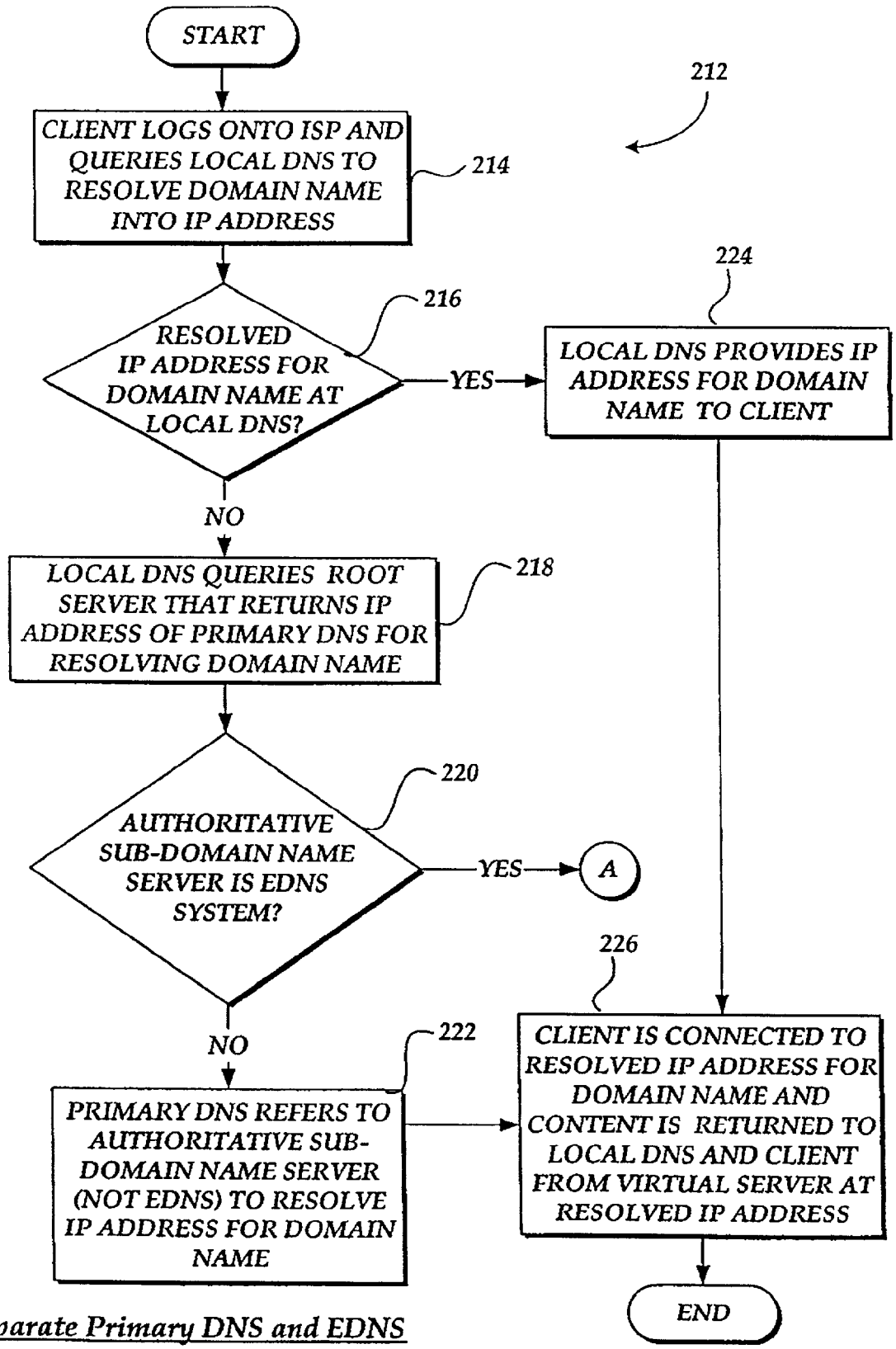
FIGS. 5A and 5B show the logic flow for a separate Primary DNS and a separate EDNS system.
Figure 5B:
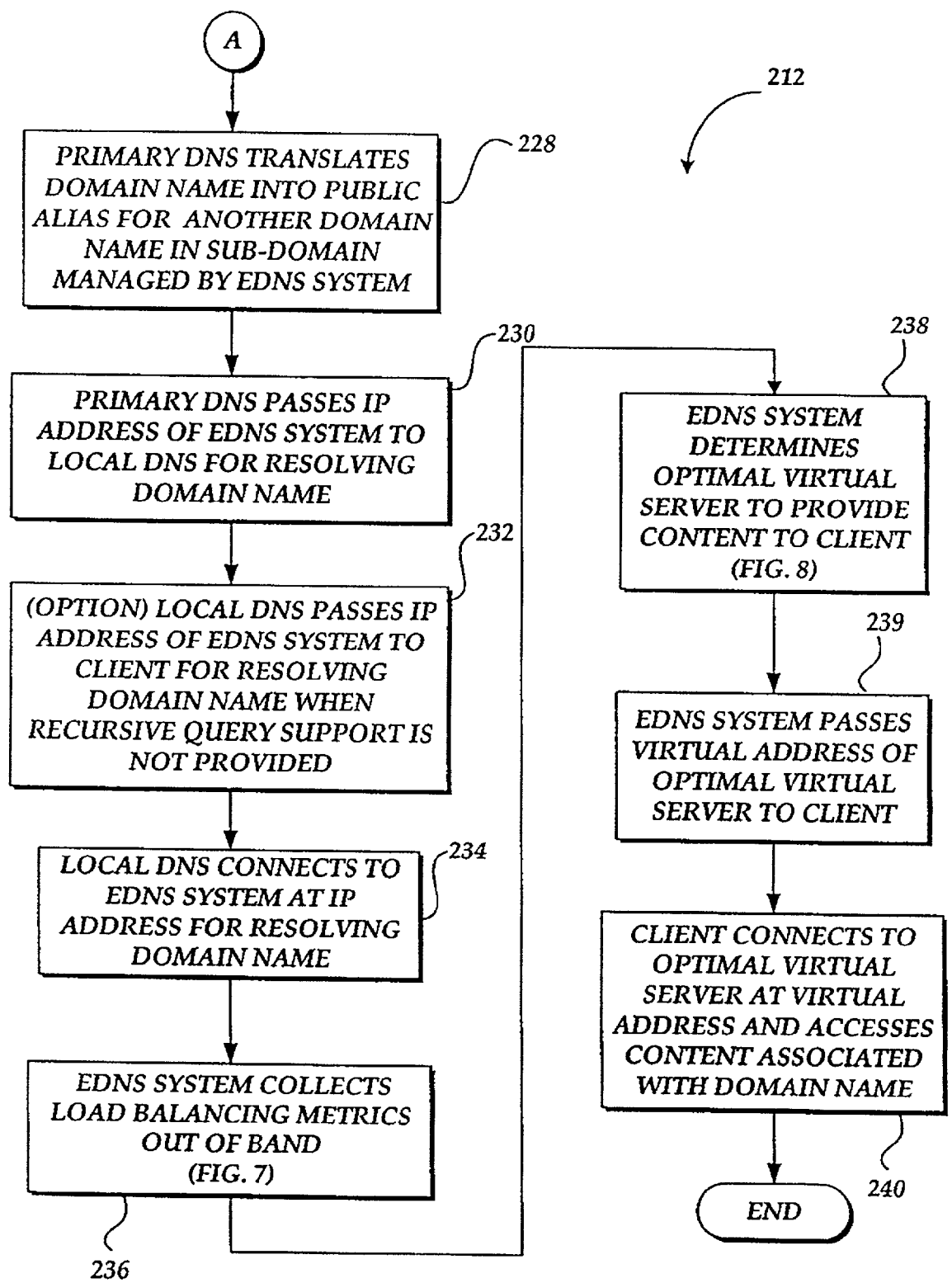
Figure 7:
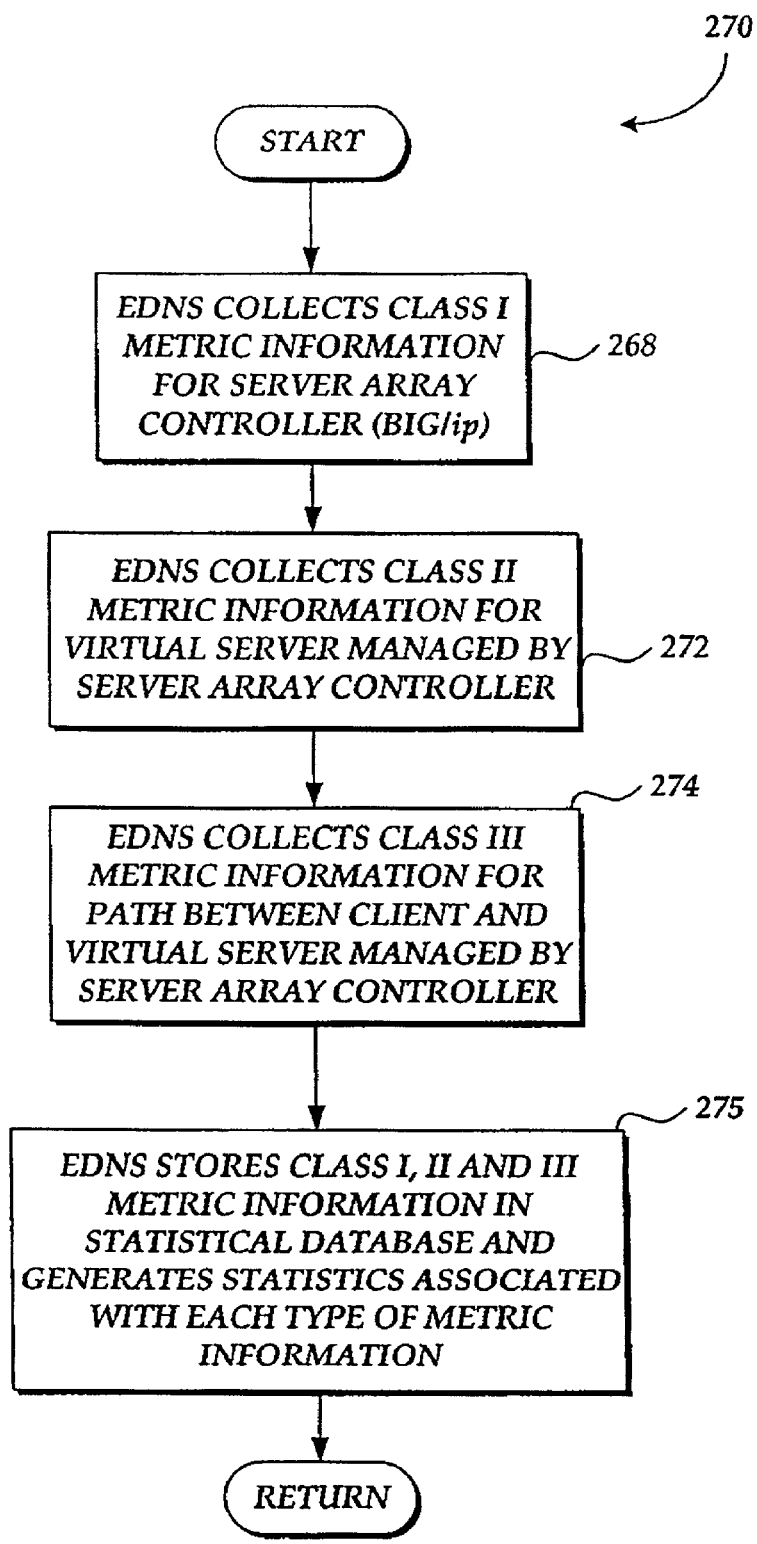
FIG. 7 shows the logic flow for collecting load-balancing metrics out of band.
Figure 8:
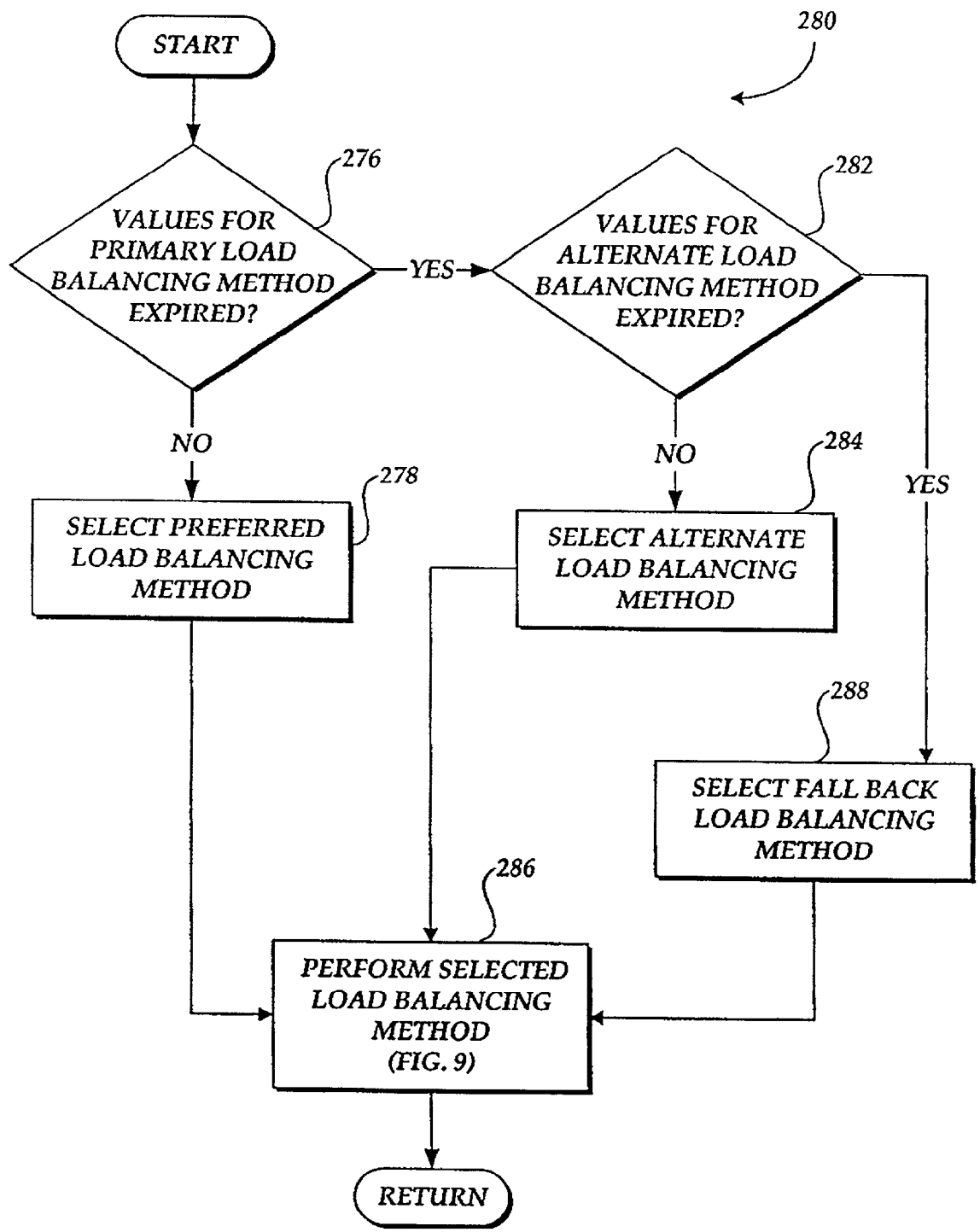
FIG. 8 illustrates the logic flow for selecting one of several predetermined load-balancing methods.

In FIGS. 5A and 5B, an overview 212 is shown of the logic flow for a WAN architecture when an EDNS system is added to an existing network that includes a separate Primary DNS server. Moving from a start block, the logic steps to a block 214 where the client logs onto (connects to) an ISP and queries a local DNS server to provide a resolved IP address for a domain name request. At a decision block 216, the logic determines if the resolved IP address is located in a cache for the local DNS server. If so, the logic moves to a block 224 where the local DNS server provides the cached IP address that is associated (resolved) with the domain name to the client. Flowing to a block 226, the client is connected to the resolved IP address so that the client may access resources (content) associated with the domain name. Next, the logic moves to an end block and the logic is terminated. However, at the decision block 216, if the resolved IP address is not located in a cache for the local DNS server, the logic advances to a block 218. The local DNS server queries a root server that returns the IP address of a Primary DNS that is the authoritative source for zone information related to the requested domain name. Moving to a decision block 220, the local DNS server connects to the returned IP address for the Primary DNS server. Also, if the Primary DNS server determines that the authoritative sub-domain server for the requested domain name is not an EDNS system, the logic steps to a block 222. The non-EDNS authoritative sub-domain server will resolve the requested domain name into an IP address that is provided to the client. The logic advances to the block 226 where substantially the same logic discussed above is performed, i.e., the client connects to the resolved IP address and access resources associated with the domain name. Next, the logic advances to the end block and terminates. Alternatively, at decision block 220, if the Primary DNS server determines that the authoritative sub-domain server is a EDNS system, the logic moves to a block 228 as shown in FIG. 5B. The Primary DNS server translates the domain name into a public alias for another domain name in the sub-domain managed by the EDNS system. The logic flows to a block 230 where the primary DNS server passes the IP address of the EDNS system to the local DNS. Optionally, when the local DNS server does not support a recursive query, the logic may step to a block 232 where the local DNS may provide the IP address of the EDNS system to the client for resolving the IP address associated with the domain name. Advancing to a block 234, the local DNS server connects to the EDNS system and requests a resolved IP address for the requested domain name. At a block 236, the EDNS system collects load-balancing metrics out of band as shown in FIG. 7 discussed below. The logic steps to a block 238 where the EDNS system determines the optimal virtual server to 15 provide content to the client as illustrated in FIG. 8 discussed in greater detail below. At a block 239, the EDNS system returns the virtual IP address of the optimal virtual server to the client. The logic flows to a block 240 where the client connects to the optimal virtual server at the virtual IP address and accesses resources associated with the domain name. Next, the logic moves to an end block and the logic is terminated.

Figure 6B:
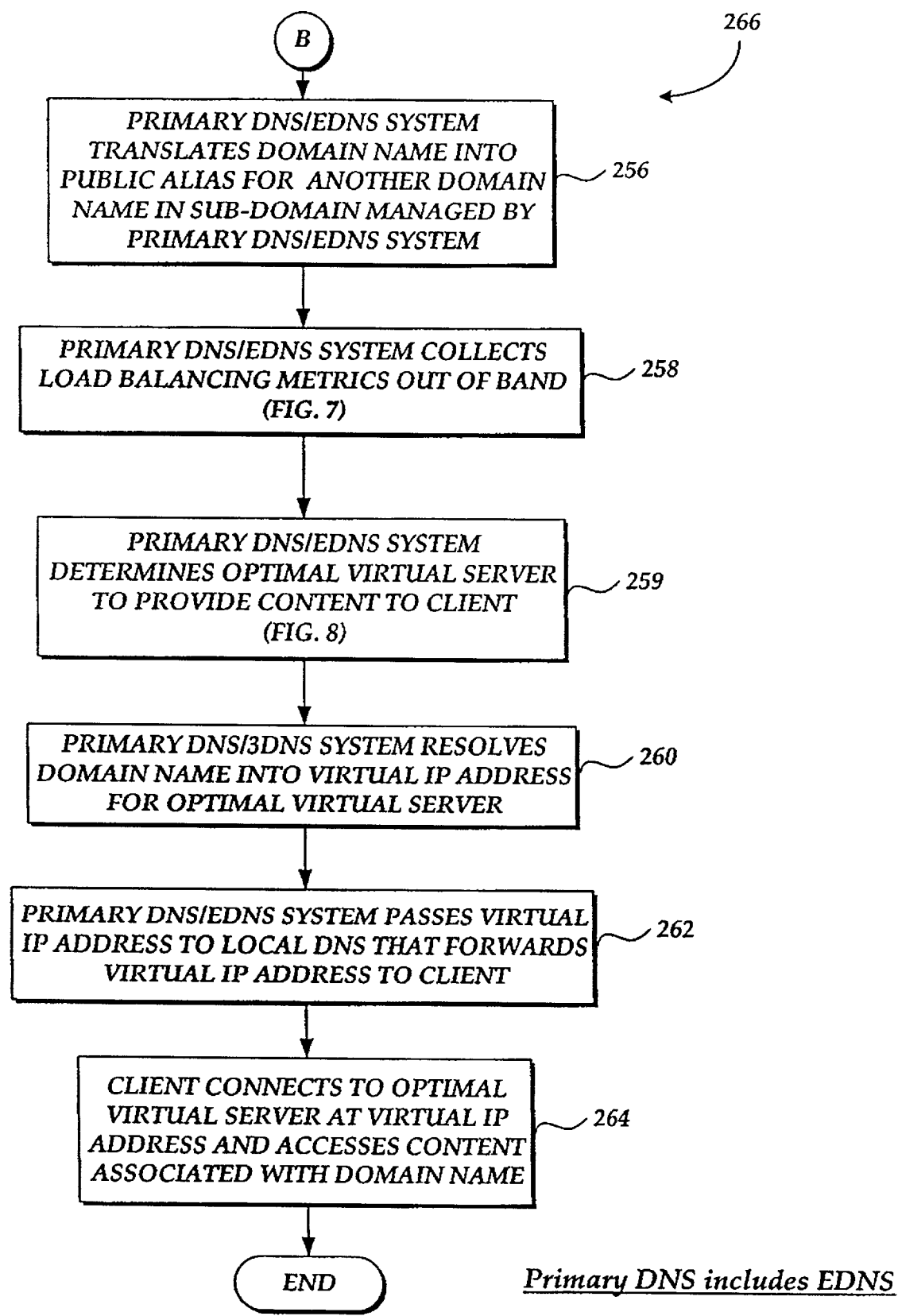

Turning to FIGS. 6A and 6B, an overview 266 is illustrated of the logic flow for processing a domain name request in a WAN architecture that includes a Primary DNS server and an EDNS server in the same system at a data center. Moving from a start block, the logic flows to a block 242 where the client logs onto (connects 25 to) an ISP and queries a local DNS server to provide a resolved IP address for a domain name request. At a decision block 244, the logic determines if the resolved IP address is located in a cache for the local DNS server. If so, the logic moves to a block 252 where the local DNS server provides the cached IP address that is associated (resolved) with the domain name to the client. Flowing to a block 254, the client is connected to the resolved IP address so that the client may access resources (content) associated with the domain name. Next, the logic moves to an end block and the logic is terminated. Alternatively, at the decision block 244, if the resolved IP address is not located in a cache for the local DNS server, the logic advances to a block 246. The local DNS server queries a root server that returns the IP address of a Primary DNS/EDNS system that is the authoritative source for zone information related to the requested domain name. Moving to a decision block 248, the local DNS server connects to the returned IP address for the Primary DNS/EDNS system. Also, if the Primary DNS/EDNS system determines that the authoritative sub-domain is not delegated to the system, the logic steps to a block 250. The Primary DNS/EDNS system refers the local DNS to the IP address of the actual authoritative subdomain server delegated to resolve the requested domain name into a different IP address, which is provided to the client. The logic advances to the block 254 where substantially the same logic discussed above is performed, i.e., the client will connect to the resolved IP address and access resources associated with the domain name. Next, the logic advances to the end block and terminates. However, at the decision block 248, if the Primary DNS/EDNS system determines that the authoritative sub-domain server is the system, the logic moves to a block 256 as shown in FIG. 6B. The Primary DNS/EDNS system translates the domain name into a public alias for another domain name in the subdomain delegated to the Primary DNS/EDNS system. However, if the Primary DNS/EDNS system includes a Primary DNS server in the same computer as the Primary EDNS server, this delegation is not required or done. The logic flows to a block 258 where the Primary DNS/EDNS system collects load-balancing metrics out of band as shown in FIG. 7 discussed below. The logic steps to a block 259 where the Primary DNS/EDNS system determines the optimal virtual server to provide content to the client as illustrated in FIG. 8, which is discussed in greater detail below. At a block 260, the Primary DNS/EDNS system resolves the domain name into a virtual IP address for the optimal virtual server to provide access to resources associated with the domain name. The logic flows to a block 262 where the virtual IP address is returned to the local DNS server and the client. At a block 264, the client connects to the optimal virtual server at the virtual IP address and accesses the resources associated with the domain name. Next, the logic steps to an end block and terminates.

Metric Information Collection

In FIG. 7, an overview 270 is presented of the logic flow performed by a Primary EDNS server to collect metric information out of band with an EDNSA program. Advancing from a start block, the logic moves to a block 268 where the Primary EDNS server collects Class I metric information associated with each SAC. The Class I metric information includes packet rate, CPU utilization and up versus down status of the controller. The SAC is down when the maximum predefined number of connections to the SAC is exceeded. Once, the controller is "down" the Primary EDNS server will wait for a user-defined number of seconds before trying to refresh the up/down status of the controller. Additionally, an "alive" time stamp is provided each time the Primary EDNS server receives any communication from an EDNSA program that monitors the SAC. Also, a "data" time stamp is provided each time the Primary EDNS server receives an iQuery protocol packet containing Class I metric information from the EDNSA program that is monitoring the SAC. Flowing to a block 272, the Primary EDNS server collects out of band from a EDNSA program the Class II metric information associated with each virtual server managed by the SAC. The Class II metric information includes the current number of connections per virtual server, average packet rate of all nodes assigned to each virtual server, number of nodes alive per virtual server and the up versus down status of each virtual server. The up/down status of a virtual server is determined by considering several factors, including: (1) is the SAC or Host machine that governs the virtual server available; (2) is the virtual server enabled; (3) is the number of available connections for the virtual server exceeding the virtual server's connection count limit; (4) is the number of nodes servicing the virtual server greater than zero; and (5) does the metric information have a fresh time stamp, i.e., not expired? Also, for the entire load-balancing methods, the EDNS system only selects a virtual server that is identified as "up." Additionally, an "alive" time stamp is included when all of the Class II metric information is provided to the Primary EDNS server by the EDNSA program. Moving to a block 274, the Primary EDNS server collects out of band from an EDNSA program the Class III metric information associated with a path for a packet that is sent between the client and the virtual server. The Class III metric information includes round trip time (RTT or latency), packet loss and hops. RTT and packet loss are collected together and the hops metric information is separately collected. Each item of Class III metric information includes a separate "alive" time stamp. The logic advances to a block 275 where the Primary EDNS system stores Class I, II, and III metric information values in a statistical database and generates statistics associated with each metric information class. The EDNS system sorts requests for path metric information and prioritizes them based on the statistics. In this way, the EDNS system can dynamically adjust the number of requests for path metric information based on the actual number of requests answered and the statistics associated with a path. Next, the logic moves to a return block and jumps back to the main logic flow. Additionally, in another embodiment, both Primary and Secondary EDNS systems may send an iQuery message request and receive the metric information broadcasted by the EDNSA program. This embodiment enables a redundant backup of the most current metric information on each EDNS system and information updates can be performed at the same time for both the Primary and Secondary EDNS systems.

Figure 12:
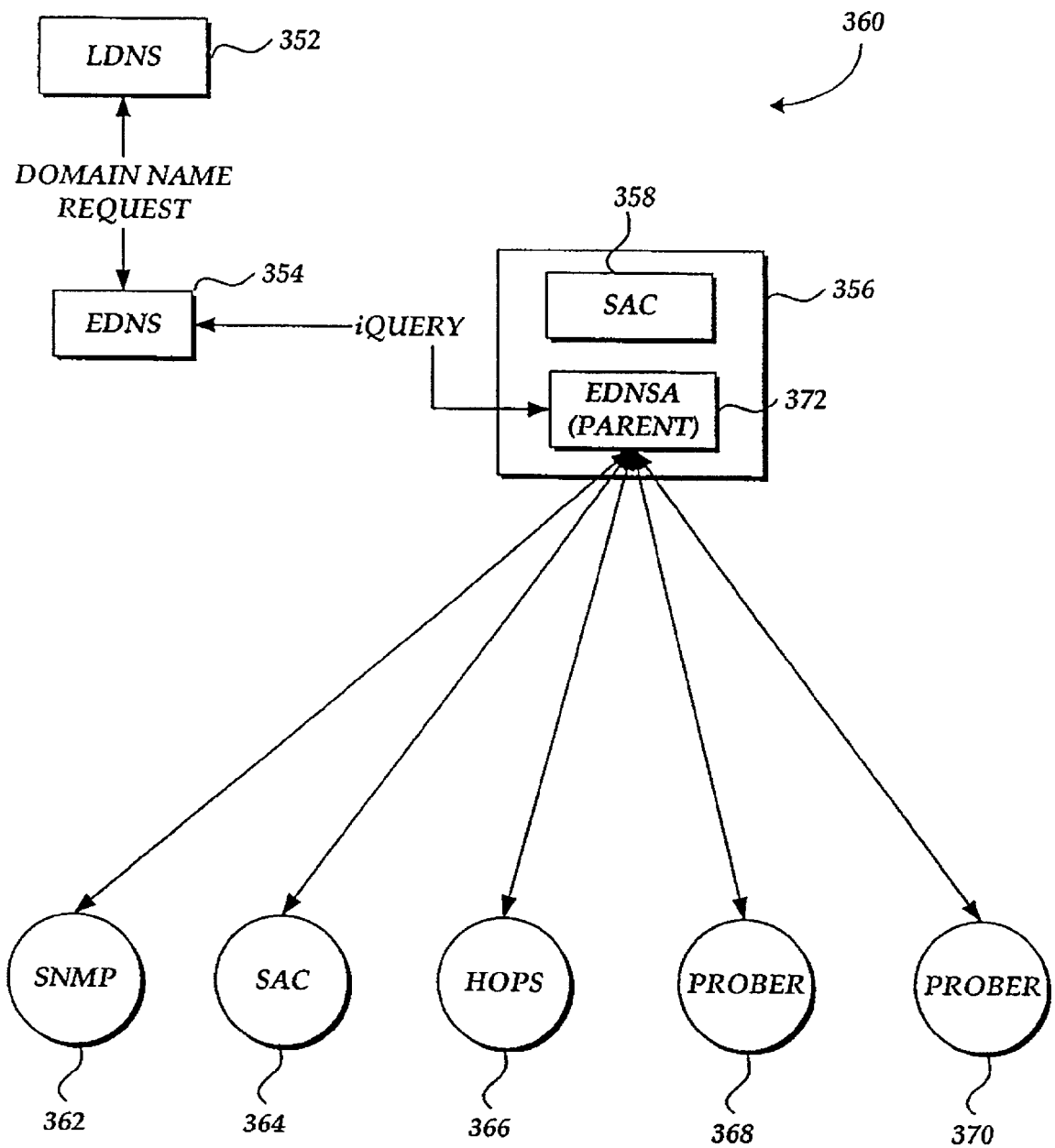
FIG. 12 illustrates the overall system architecture for a EDNSA program that has spawned child programs to collect the load-balancing metrics out of band for a Primary EDNS server.

FIG. 12 provides an overview 360 illustrating the transaction process for an out of band collection of metric information that is transferred to an EDNS system by an EDNSA program. The local DNS server 352 communicates a domain name request to the EDNS system 354 that is the authoritative source for information related to the sub-domain name. Out of band of the domain resolution process, the EDNS system communicates an iQuery protocol request to an EDNSA program 372 disposed at a data center 356 which is in communication with a SAC 358. In this example, the EDNSA program 372 is a parent application that has spawned several child factories to collect various types of metric information. These child factories include: (1) an SNMP reader 362 for collecting Class I and II metric information from a Host machine and other types of server array controllers; (2) a SAC reader for collecting Class I and Class II metric information from the SAC 358; (3) a hops reader for collecting Class III metric information related to hops; and (4) a prober for collecting Class III packet loss and RTT metric information. The EDNSA program 372 provides the collected metric information to the EDNS system 354 by an iQuery protocol request at defined intervals. Although not shown here, the EDNS system 354 may employ the iQuery protocol to request collected metric information from several EDNSA programs that are separately disposed at geographically distributed data centers. Additionally, in another embodiment, the Secondary or Primary EDNS may run the EDNSA program for collecting the metric information. Also, the EDNSA program may be disposed with a Host machine for collecting metric information related to RTT, completion rate and the number of hops between routers for a transaction between a virtual server and the local DNS.

Statistics

The Primary EDNS system generates statistics related to each SAC, Host, virtual server, path, local DNS and Wide IP. For example, the SAC statistics include: (1) the up versus down availability of the SAC; (2) the number of iQuery packets between a EDNS system and a SAC; (3) the total number of packets in and out of the SAC; (4) the number of packets sent per second; (5) the number of virtual servers managed by the SAC; (6) the number of times data is refreshed using the iQuery protocol; and (7) the amount of time the SAC is active. For a Host machine, the statistics include: (1) the number of virtual servers managed by the Host machine; (2) the number of times a particular Host machine was chosen by a Wide IP for load-balancing; and (3) the number of times data is refreshed. The virtual server statistics include: (1) the number of times a particular virtual machine was chosen by a Wide IP for load-balancing; (2) the number of times data is refreshed; (3) the number of connections that are handled by the virtual server; and (4) the up versus down availability of the virtual server. The path statistics include: (1) the average RTT for transactions between the SAC and a local DNS; (2) the packet completion rate (packet loss); (3) the number of times a specified path is chosen; (4) the number of times that the EDNS system has received data about the specified path; and (5) the number of hops between routers for a transaction between a virtual server and the local DNS. The Local DNS statistics include a measure of how often a particular Local DNS is used and the number of times that the EDNS system received a resolution request from this Local DNS. The Wide IP statistics include: (1) the weighting values for the virtual servers managed by a particular SAC; (2) the weighting values for the virtual servers managed by other Host machines; (3) the number of successful name resolutions; (4) the number of unsuccessful name resolutions; (5) the load-balancing modes used for the pool of virtual servers managed by each SAC; (6) the load-balancing modes used for the pool of virtual servers managed by each Host machine; (7) the number of virtual servers managed by each SAC which are used to load balance the specified Wide IP; and (8) the number of virtual servers managed by each Host machine which are used to load balance the specified Wide IP.

Load-balancing Methods

FIG. 8 provides an overview 280 of the logic used to select a predefined load-balancing method. Advancing from a start block, the logic steps to a decision block 276 where it is determined if the time stamp is expired for metric information associated with the preferred load-balancing method. If not, the logic flows to a block 278 and the preferred load-balancing method is selected for determining the optimal virtual server to provide access to resources associated with a requested domain name. The logic moves to a block 286 where the selected (preferred) load-balancing method is performed. The performance of the selected load-balancing method is shown in FIGS. 8, 9, 10A and 10B that are discussed below. Next, the logic steps to a return block and returns to the main logic flow of the transaction process. However, if the determination at the decision block 276 is true, i.e., the time stamp is expired, the logic advances to a decision block 282 where it is determined if a time stamp for the values for the alternate load-balancing method is expired. If negative, the logic steps to a block 284 where the alternate load-balancing method is selected to determine the optimal virtual server to provide access to resources associated with a requested domain name. Moving to the block 286, the selected (alternate) load-balancing method is performed and the logic advances to the return block where it jumps back to the main logic flow of the transaction process. Alternatively, if the determination at the decision block 282 is true, i.e., the time stamp expired for the values for the alternate load-balancing method, then the logic will flow to a block 288 where a fall back load-balancing method is selected to determine the optimal virtual server to provide access to resources associated with a requested domain name. Stepping to the block 286, the selected (fall back) load-balancing method is performed and the logic advances to the return block where it returns to the main logic flow of the transaction process.

Figure 9:
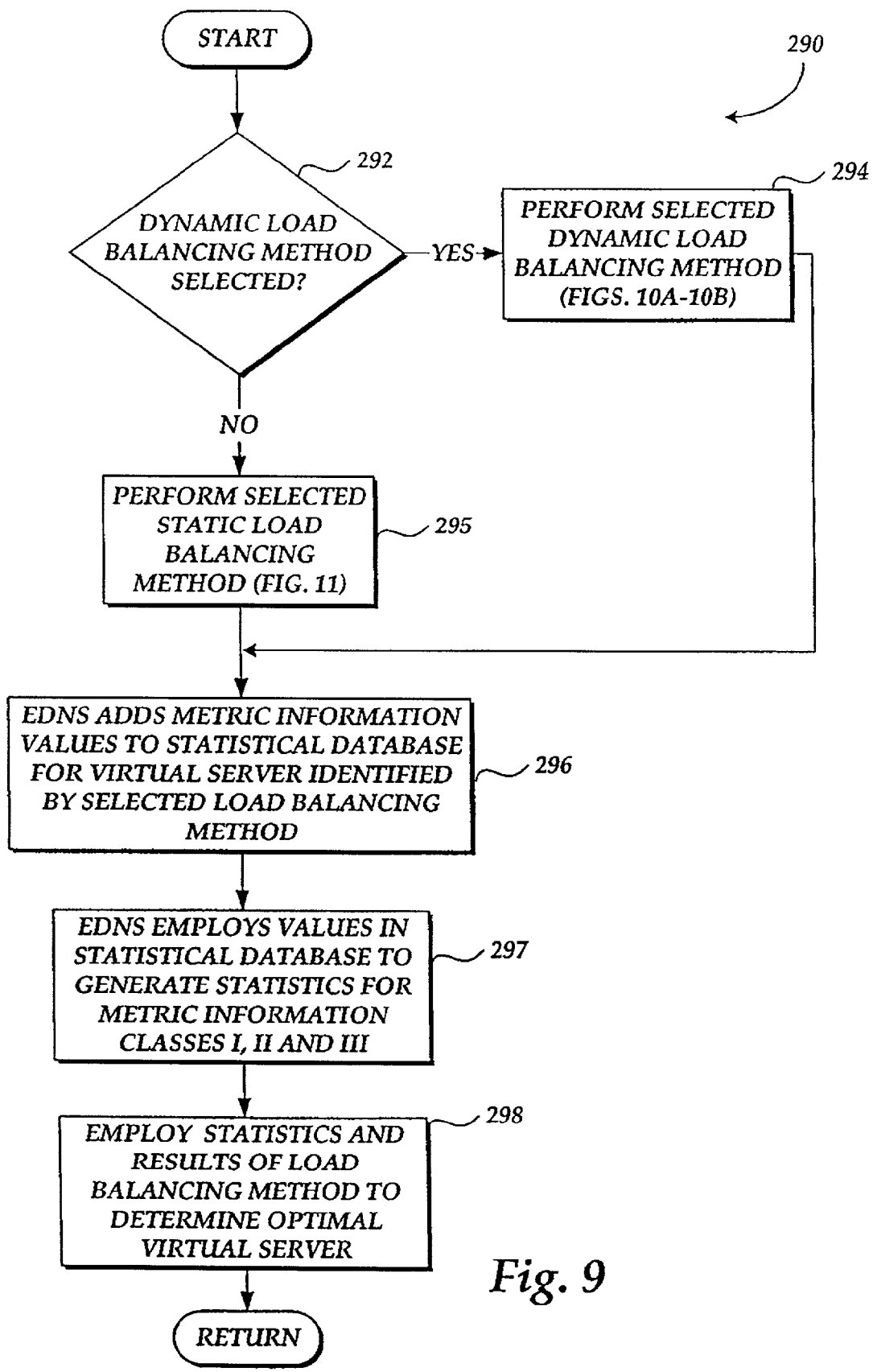
FIG. 9 shows the logic flow for employing the selected load-balancing method to determine the optimal virtual server for the client.
Figure 10A:
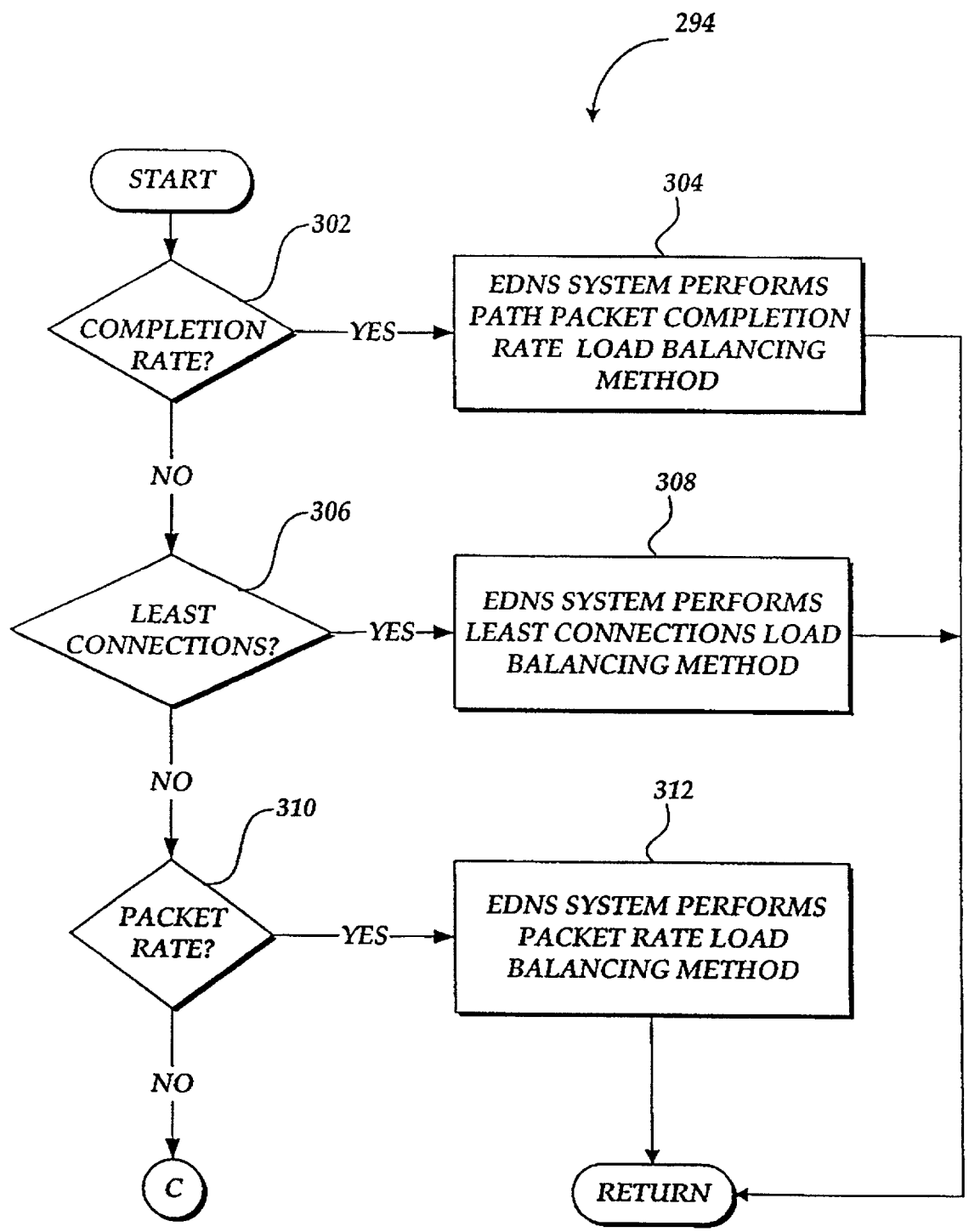
FIGS. 10A and 10B illustrate the logic flow for implementing a selected dynamic load-balancing method.
Figure 10B:
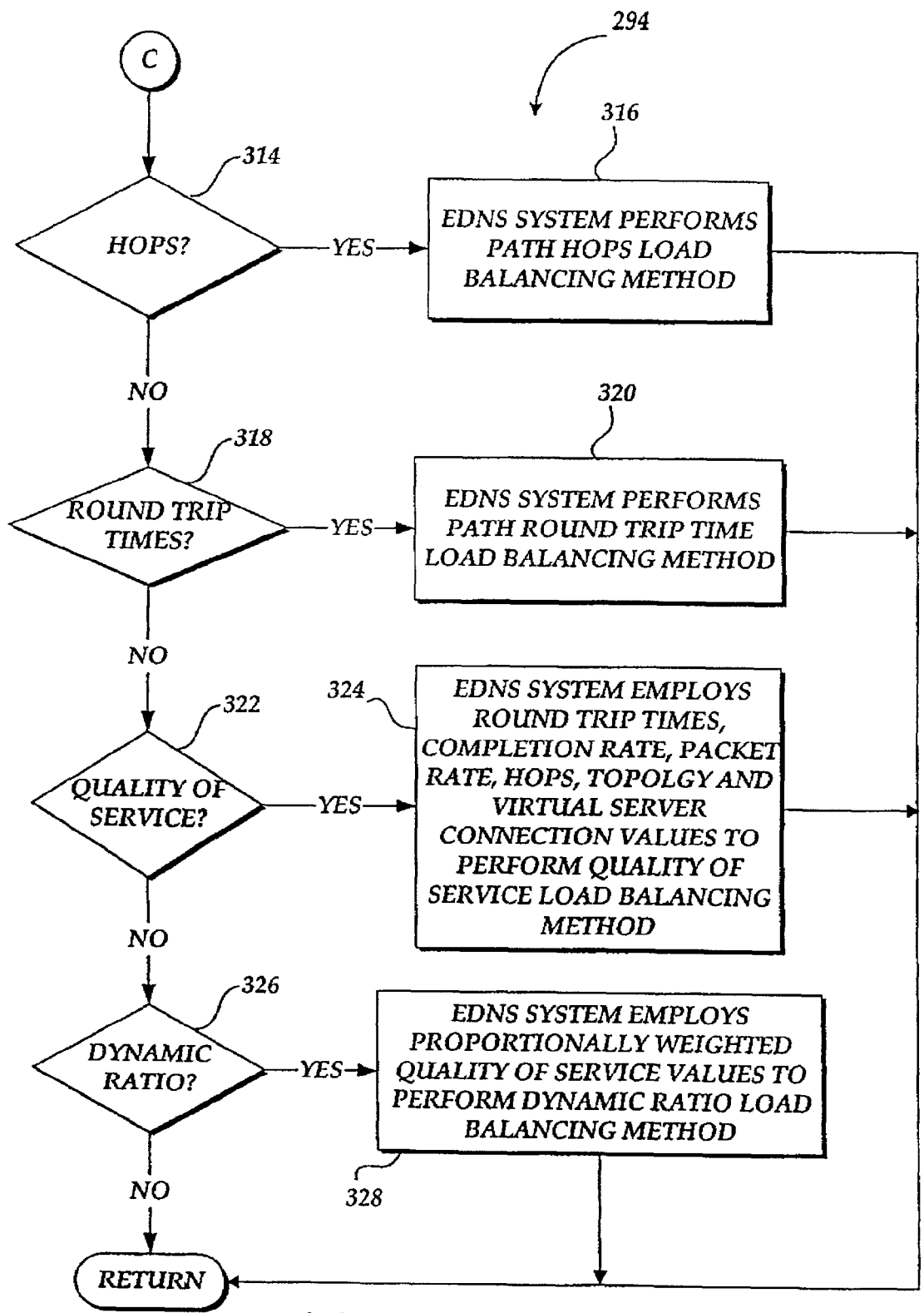
Figure 11:
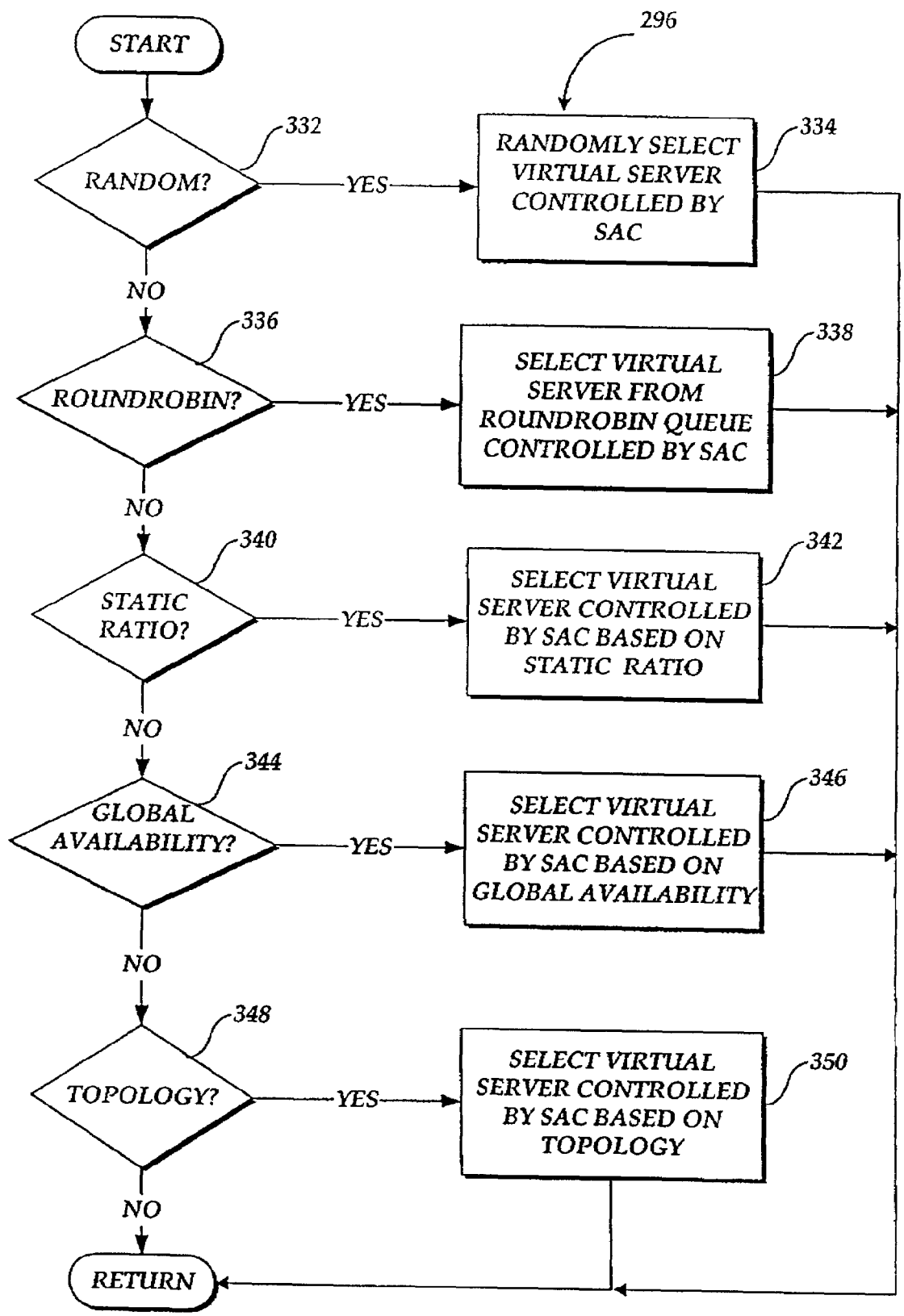
FIG. 11 shows the logic flow for using a selected static load-balancing methods.

In FIG. 9, an overview 290 is shown of the logic for performing the selected load-balancing method. Flowing from a start block, the logic moves to a decision block 292 where it is determined if a dynamic load-balancing method is selected. If so, the logic steps to a block 294 and the selected dynamic load-balancing method is performed. As discussed below, FIGS. 10A and 10B show in greater detail the performance of the selected dynamic load-balancing method. The logic advances to a block 296 where the EDNS system will add the collected metric information values for the virtual server identified by the selected load-balancing method to a statistical database. The logic steps to a block 297 where the EDNS system employs the values stored in the statistical database to generate statistics for all classes of metric information. The logic flows to a block 298 where the generated statistics may be displayed to the user. Also, these statistics and the results of the selected load-balancing method are employed to choose an optimal virtual server to provide the client with access to resources associated with the domain name request. Next, the logic steps to a return block and returns to the main logic flow. Alternatively, if a dynamic load-balancing mode is not selected, the logic moves from the decision block 292 and flows to the block 295 where the selected static load-balancing method is performed. As discussed below, FIG. 11 shows in greater detail the performance of the selected static load-balancing method. Next, the logic advances through blocks 296, 297 and 298 where substantially the same steps as described above are performed to select a virtual server to provide the client with access to resources associated with the domain name request. Next, the logic advances to a return block and jumps back to the main logic of the transaction process.

FIGS. 10A and 10B illustrate the logic used to perform a selected dynamic load-balancing method as shown in the block 294 in FIG. 9. Moving from a start block to a decision block 302, a determination is made if the path packet completion rate load-balancing method is selected. If true, the logic moves to a block 304 and the EDNS system employs the path packet completion rate values to perform the selected method, which determines a virtual server on a SAC that is dropping or timing out the least number of packets between the virtual server and the local DNS. The logic moves to a return block and returns to the logic flow at block 294 in FIG. 9. Alternatively, if the determination at the decision block 302 is false, the logic advances to a decision block 306 where a determination is made whether the least connections load-balancing method is selected. If true, the logic steps to a block 308 and the EDNS system employs the least connections values to perform the selected method which determines a virtual server on a SAC that is currently maintaining the least number of connections. Next, the logic moves to a return block and returns to the logic flow at block 294 in FIG. 9. However, if the determination at the decision block 306 is false, the logic advances to a decision block 310 where a determination is made whether the packet rate values load-balancing method is selected. If true, the logic steps to a block 312 and the EDNS system employs the packet rate values to perform the selected method which determines a virtual server on a SAC that is currently processing least number of packets per second. The logic moves to a return block and returns to the logic flow at block 294 in FIG. 9. Also, if the determination at the decision block 310 is false, the logic advances to a decision block 314 illustrated in FIG. 10B where a determination is made whether the hops load-balancing method is selected. If true, the logic steps to a block 316 and the EDNS system employs the hops values to perform the selected method which determines a virtual server on a SAC that uses the least number of hops between routers to reach the local DNS. Next, the logic moves to a return block and returns to the logic flow at block 294 in FIG. 9. Additionally, if the determination at the decision block 314 is false, the logic advances to a decision block 318 where a determination is made whether the round trip times load-balancing mode is selected. If true, the logic steps to a block 320 and the EDNS system employs the round trip times values to perform the selected method which determines a virtual server on a SAC that has the fastest measured round trip time from the SAC to the local DNS. Next, the logic moves to a return block and returns to the logic flow at block 294 in FIG. 9. Alternatively, if the determination at the decision block 318 is false, the logic advances to a decision block 322 where a determination is made whether the Quality of Service (QOS) load-balancing mode is selected. If true, the logic steps to a block 324 and the EDNS system employs a user configurable combination of all collected metric information to define a QOS metric value. This method determines a virtual server on a SAC that has the highest metric value. A user configurable QOS equation for determining the QOS metric value is as follows: QOS=A(1/packet rate)+B(1/round trIP time)+C(1/hops)+D(virtual server capacity)+E(completion rate)+F(topology score). The user may edit the QOS variables A, B, C, D, E and F to weight the various portions of the collected metric information and define the QOS metric value. Each of these metric values could also be associated with a QOS variable to individually weight their effect on the QOS score. The available number of connections and the average packet rate of the nodes behind the SAC that serve the virtual server determine the virtual server capacity. Also, the topology score is set in a user configurable topology score statement 376 as illustrated in FIG. 14. Next, the logic moves to a return block and returns to the logic flow at block 294 in FIG. 9. Further, if the determination at the decision block 322 is false, the logic advances to a decision block 326 where a determination is made whether the Dynamic Ratio load-balancing mode is selected. If true, the logic steps to a block 328 and the EDNS system employs a user configurable combination of weights for the Quality of Service metric information to define a Dynamic Ratio metric value for each virtual server for a period of time. Repeated requests from a particular Local DNS are distributed to virtual servers so that the proportions defined by the Dynamic Ratio metric values are maintained. The following equations in TABLE 1 are used to pick a virtual server from a given pool in accordance with the Dynamic Ratio load-balancing setting:

TABLE 1

Equation I. Compute the ACS score for each VS in the pool

QOS (VS) = A(p/Packet Rate) + B(k/Ebytes Per Second) +
C(r/round trip time) + D(h/hops) +
E(virtual server capacity/v) + F(completion rate/c) +
G(topology score/t)

Equation II. Sum the QOS scores computed for the pool

QOS_sum = Sum of QOS score of all virtual servers in this pool
Equation III. Pick a random floating point number between C and QOS_sum Dart = Random number between 0 and QOS_sum
Equation IV. Loop through the virtual servers to find the one picked Sum = 0
For each VS in Pool Sum = Sum + QOS)VS)
If (Sum > = Dart) then pick this VS The user may edit the QOS coefficients A, B, C, D, E, F, and G, and the QOS normalization factors p, k, r, h, v, c, and t in order to weight the various portions of the collected metric information and tailor the resulting traffic distribution. In this method, the traffic is distributed to virtual servers in proportion to their QOS scores. Next, the logic moves to a return block and returns to the logic flow at block 294 in FIG. 9.

FIG. 11 illustrates the logic used to perform a selected static load-balancing method as shown in the block 296 in FIG. 9. Moving from a start block to a decision block 332, a determination is made if the random load-balancing method is selected. If true, the logic moves to a block 334 and the EDNS system performs the selected method by randomly selecting a virtual server on a SAC. The logic moves to a return block and returns to the logic flow at block 296 in FIG. 9. Alternatively, if the determination at the decision block 332 is false, the logic advances to a decision block 336 where a determination is made whether the round robin load-balancing method is selected. If true, the logic steps to a block 338 and the EDNS system performs the selected method by selecting a virtual server from a round robin queue managed by a SAC. Next, the logic moves to a return block and returns to the logic flow at block 296 in FIG. 9. Also, if the determination at the decision block 336 is false, the logic advances to a decision block 340 where a determination is made whether the static ratio load-balancing method is selected. If true, the logic steps to a block 342 and the EDNS system performs the selected method by selecting a virtual server from a weighted round robin queue managed by a SAC. Each virtual server has a user configurable value that is weighted to determine the proportion of connections that will go to each virtual server over time. The higher the weighted value, the more connections to the virtual server. In this way, the user may weight the number of connections provided to each virtual server based on the particular capabilities of each server. Next, the logic moves to a return block and returns to the logic flow at block 296 in FIG. 9. Further, if the determination at the decision block 340 is false, the logic advances to a decision block 344 where a determination is made whether the global availability load-balancing method is selected. If true, the logic steps to a block 346 and the EDNS system performs the selected method by selecting an available virtual server from a user configurable global availability list that is prioritized. Each EDNS server on a network can have a differently configured global availability list. Next, the logic moves to a return block and returns to the logic flow at block 296 in FIG. 9. However, if the determination at the decision block 344 is false, the logic advances to a decision block 348 where a determination is made whether the topology load-balancing method is selected. If true, the logic steps to a block 350 and the EDNS system performs the selected method by selecting an available virtual server from a user configurable topology statement 374 as illustrated in FIG. 13. Generally, each EDNS server on a network employs the same topology statement that causes domain name requests to be redirected to virtual servers that are within a particular geographic region. However, each EDNS server could also use differently configured topology statements. Next, the logic moves to a return block and returns to the logic flow at block 296 in FIG. 9. Another embodiment of the present invention could position the EDNS system at the data center that includes the local DNS for reducing the amount of time to resolve an IP address for a virtual server that can provide access to resources associated with a domain name request. The EDNS system could be included with a cache server for the local DNS. The EDNS system at the same data center as the local DNS may be a primary or secondary EDNS and it may include a primary DNS or a secondary DNS. Additionally, the logic flow for an EDNS system positioned at the same data center as the local DNS is substantially similar to the transaction logic discussed above.

Figure 15:
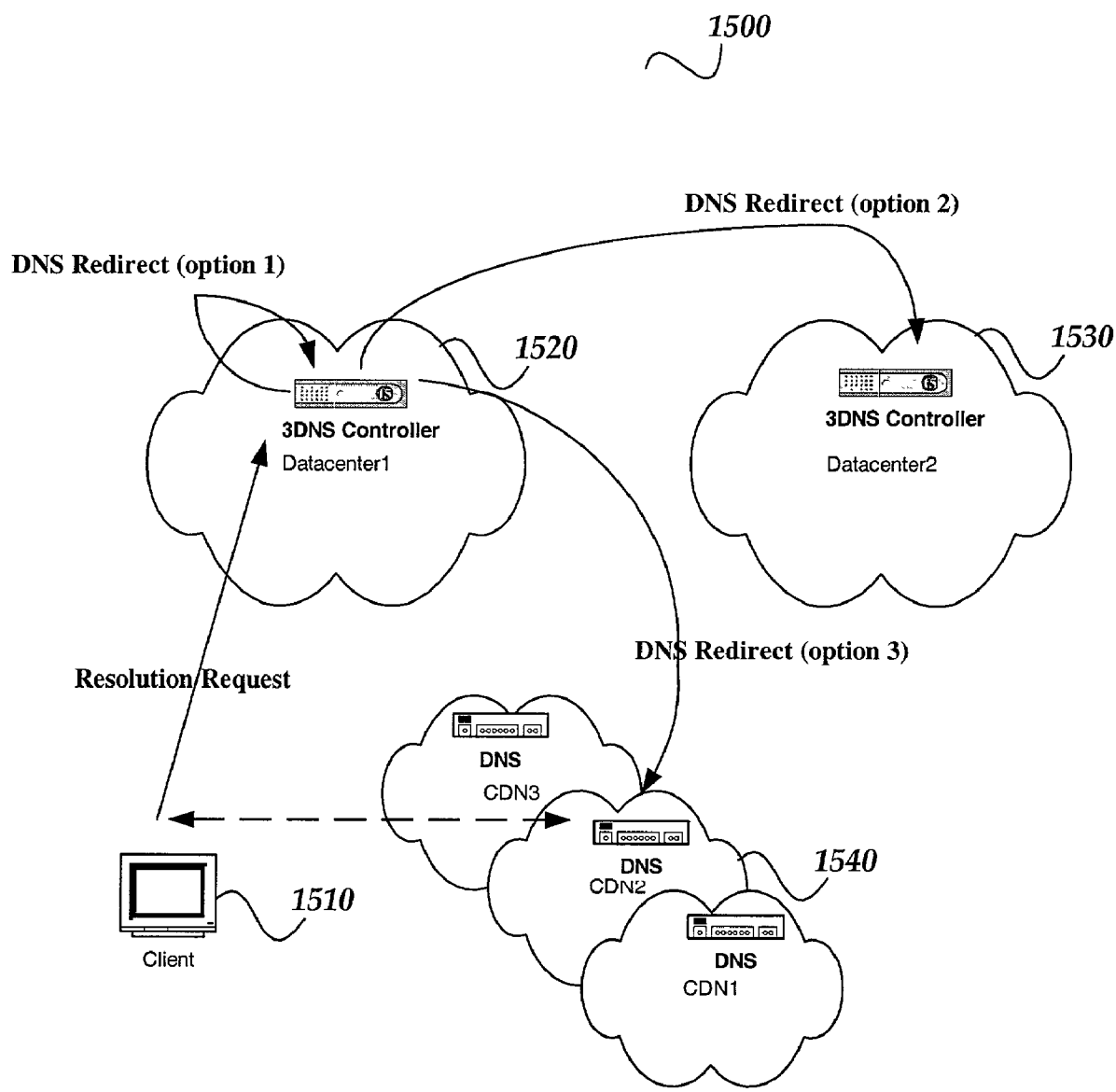
FIG. 15 illustrates a name server load-balancing system.

FIG. 15 illustrates a name server load-balancing system. The name server load-balancing system 1500 is directed at bridging disparate CDNs for content providers (CP) by load-balancing name servers using the options described above for load-balancing addresses. An EDNS, such as a 3-DNS made by F5, Inc., of Seattle, Wash., load balances all name servers for content providers. During the DNS request each network architecture has an opportunity to view a transaction in order to transfer control from one architecture to another.

According to one embodiment of the invention, a virtual delegation mechanism allows the EDNS server to control the traffic to remain on the original site and to control the traffic delegated to another networks DNS. As discussed below in FIG. 16, geographic criteria metric information is collected and stored that is used to segment IP addresses into physical locations. For example, local DNS servers can be classified to the continent or country level, segmenting North American traffic and non-North American traffic. Additionally, a threshold limitation for virtual servers allows the EDNS to route traffic to another server when the threshold limitation is reached.

Referring to FIG. 15, a client 1510 makes a request for an address. The client's local name server (local DNS server) makes requests to an authoritative name server (DNS) for a zone. According to one embodiment, the client's local DNS server may be the authoritative DNS for a zone. At this point, the network conditions are examined and the traffic is distributed appropriately. Controlling traffic distribution between the CDN and the origin site may be achieved by controlling the distribution as name server (NS) requests are made. All member name servers may become authoritative secondary name servers for the zone the host resides in that requires distribution. Accordingly, EDNS server 1520 at Datacenter1 may delegate traffic to EDNS server 1530 at Datacenter2 and DNSs 1540 associated with CDN1, CDN2 and CDN3, respectively. However, the delegation scheme as described below provides an alternative embodiment where the member name servers manage a sub-domain. The name servers do not override their own list of authoritative name servers. Additionally, an association between NS load-balancing and a domain name may be formed. If an association is not formed, all hosts in the zone or all zones managed by the NS are associated. The load-balancing, distribution methods, and techniques described above can be applied to name server lists as well as virtual server lists.

According to one embodiment of the present invention, name server TTL values are set low to help establish "better" answers. As setting the TTL values low may increase the load on the name servers, additional name servers may be used to handle the additional load. These TTL values may be set based on many different factors, including network conditions, and the like. TABLE 2 shows an exemplary zone file configuration for db.domain.com.

TABLE 2

| | | | | |
|---|---|---|---|---|
| subdomain.domain.com. | 30 | IN | NS | 3dns0 |
| | 30 | IN | NS | 3dns1 |
| | 30 | IN | NS | cdn0 |
| | 30 | IN | NS | cdn1 |
| www.domain.com. | 30 | IN | A | vs0 |
| | 30 | IN | A | vs1 |
| | 30 | IN | A | vs3 |
| | 30 | IN | A | vs4 |

TABLE 3 illustrates an exemplary Wide IP configuration.

TABLE 3

```
wideip {
    name    "subdomain.domain.com"
    port    80
    pool_lbmode ratio
    pool {
            name        "3-DNS Pool"
            type        NS
            ratio       8       // 80% to this pool
            preferred   RTT //QOS, etc
            alternate   packet_rate
            fallback    ratio
            address     3dns0
            address     3dns1
    }
    pool {
            name        "CDN Pool"
            type        NS
            ratio       2       // 20% to this pool
            preferred   packet_rate
            alternate   rr
            address     cdn0
            address     cdn1
    }
}
wideip {
    name    "www.subdomain.domain.com"
    port    80
    pool {
            name        "Virtual Server Pool"
            type        A
            preferred   qos
            alternate   packet_rate
            fallback    topology
            address     vs0
            address     vs1
            address     vs2
            address     vs3
    }
}
```

According to another embodiment of the invention, a sample zone file configuration is shown in TABLE 4.

TABLE 4

| | | | | |
|---|---|---|---|---|
| domain.com. | 30 | IN | NS | 3dns0 |
| | 30 | IN | NS | 3dns1 |
| subdomain.domain.com. | 30 | IN | NS | cdn0 |
| | 30 | IN | NS | cdn1 |
| www.domain.com. | 30 | IN | A | vs0 |
| | 30 | IN | A | vs1 |
| | 30 | IN | A | vs2 |
| | 30 | IN | A | vs3 |

Similarly, an exemplary Wide IP configuration associated with TABLE 3 is illustrated in TABLE 5.

TABLE 5

```
wideip {
    address  10.0.0.1
    port     80
    name     "www.domain.com"
    pool_lbmode ratio
    pool {
            name        "Virtual Server Pool"
            type        A       // default
            ratio       8       // 80% to this pool
            preferred   QOS  //RTT, etc
            alternate   packet_rate
            fallback    null    //instead of returning to DNS
            address     vs0
            address     vs1
            address     vs2
            address     vs3
    }
}
```

TABLE 5-continued

```
pool {
        name        "CDN Pool"
        type        NS      //Name Server
        cname       "www.subdomain.domain.com"
        zname       "subdomain.domain.com"
        ratio       2       // 20% to this pool
        preferred   packet_rate
        alternate   rr
        address     cdn0
        address     cdn1
    }
}
```

As can be seen by referring to TABLE 5, the virtual server pool and CDN pool use a ratio load-balancing method. Other load-balancing methods, as described, may be used. Specifically, according to TABLE 5, the virtual server pool receives 80% of the traffic and the CDN pool receives 20% of the traffic. These ratios may be adjusted based on network conditions, and the like.

According to one embodiment of the invention, a content provider provides the sub-domain and domain name to be served by the CDN. The CDN supplies the content provider a list of name servers that will receive the delegations. The list includes the fully-qualified domain name (FQDN) and IP address for each. Additionally, any information relating to the metric, and geographic information on the CDN name servers provides more data that may be used to aid in traffic distribution.

The EDNS server identifies the proximity of the resolution request and directs the request to the closest identified geographic CONTENT-SERVER, the best quality path, or the best performing CONTENT-SERVER. During runtime, the collected dynamic path data is used to derive cost metrics for network paths in topological maps. A network listener, such as a BGP listener, or an active network path monitor, such as a big3d agent produced by F5 Networks, Inc., of Seattle, Wash., gathers distance metrics, RTT, and identifies the virtual servers closest to the requesting client. According to one embodiment, "best guess" predefined topological maps are generated based on comparing local DNS server addresses against public resources such as ASN, network, DNS registration tables, and last hops. According to another embodiment, the EDNS administrator may configure topological maps via a GUI.

Figure 16:
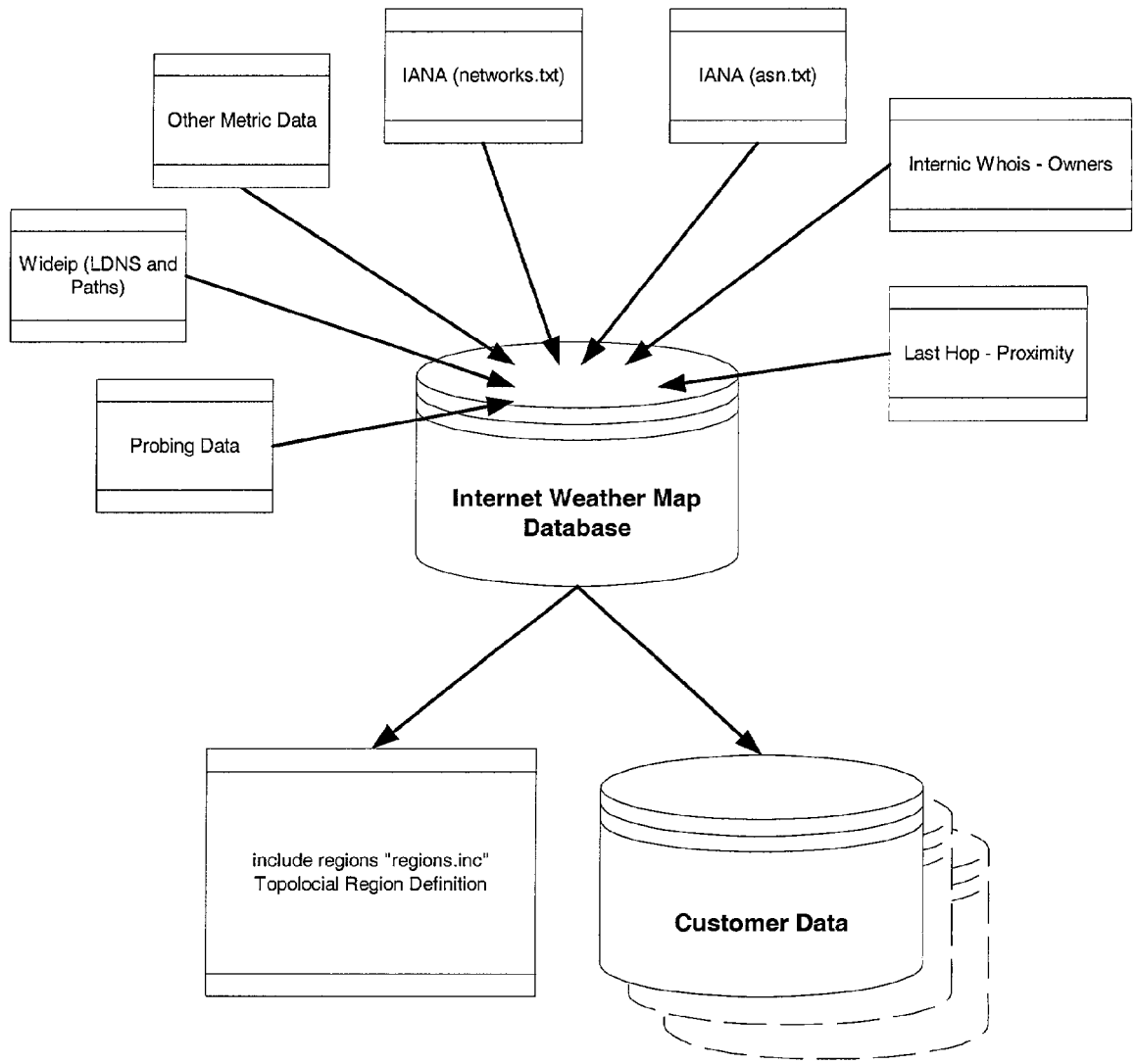
FIG. 16 shows a diagram of an internal repository to store metric information.

FIG. 16 shows a diagram of an internal repository to store metric information. According to one embodiment, the repository is created in a database that stores metrics data both for lookup references and dynamic customer local DNS server data. The reference information stored in the internal repository is bound together to determine what location an IP address resides. For example, the location may be a country, city, postal code, and the like.

Determining the location for an IP address may be problematic for any address that resolves back to a ".com" or ".net" domain name. For example, exodus.com would always come up as located in Santa Clara, Calif. when it is known that the service provider exodus.com deploys worldwide. Therefore, according to one embodiment, the "last hop" IP address is used to determine geographic proximity. Since the Internet is dynamic, the binding continually inserts new IP targets, updates owners, and verifies attributes.

Referring to FIG. 16, an Internet Database stores and collects metric information, including, but not limited to: last hop proximity data; location information for who registered an internet address ("whois" information); IANA data (asn.txt and networks.txt); and Wide IP data. Other metric data, as well as probing data may also be stored in the Internet Database. The data is extracted from the database to create region definitions for Internet addresses. The region definitions may be stored in a customer database for each customer. For example, region data for customer 1 may be stored in a database maintained for customer 1. In addition, the region definitions may be exported into a table mapping IP subnets to geographic and other region attributes, such as in TABLE 6, and made available to all customers.

TABLE 6

| IP Subnet | Continent | Country | State | City | ISP |
|---|---|---|---|---|---|
| ... | | | | | |
| 11.0.0.0/8 | North America | US | NJ | XX | ATT |
| 22.0.0.0/8 | North America | US | AZ | | |
| 33.0.0.0/8 | Europe | DE | Bavaria | | |
| 444.11.0.0/16 | North America | US | CA | San Diego | |

Passive probing is included in a SAC, such as Big-IP, to provide metric information without active probing. It has been found that passive probing versus active probing may provide a better estimation of RTT between a SAC and its clients. For example, a SAC may calculate RTT when a client requests a TCP connection. According to one embodiment, RTT is measured by taking the difference in time between corresponding SYN/ACK and ACK packets. This metric information can be stored in a tryst data structure or hash to save memory resources and provide fast look up. This metric information may also be stored in other data structures.

A SNMP prober is included for collecting metrics. Some of the metrics include disk space, memory utilization, CPU utilization, and packets and bytes processed, and new connections established. This metrics data may be viewed by the end user to monitor system and network resources. Limits and thresholds may be placed upon specific metrics to ensure high availability of server or network resources. This metric data can also be used to direct traffic in order to load balance server and network resources. According to one embodiment of the invention, load-balancing modes based on kilobytes per second, packets per second, and new connections per second are included. These load-balancing modes can be additive to the QOS load-balance mode.

According to one embodiment of the present invention, a region definition is created that attempts to "best" define the state of the database in clear-cut regions. Regions consist of a name, geographic attributes, and CIDR definitions that make up the IP addresses that could reside in that location. Regions may also contain regions to form a hierarchy of regions. For example, TABLE 7 shows an exemplary region definition.

TABLE 7

```
region {
    name "Japan"
    continent "Asia"
    country "Japan"
    city "Tokyo"
    192.168.101.0/24
    10.10.0.0/16
    192.168.10.1
    region "South Pacific Islands"
}
```

A topology mapping is created between Wide IP pools and regions, continents, countries, or IP subnets, such that traffic can be guided to that region when a requesting IP address is identified.

TABLE 8 illustrates an exemplary Wide IP configuration for directing traffic based on geographic proximity. The virtual servers in the following example could be either SAC virtual servers, such as BIG-IP virtual servers, representing banks of CONTENT SERVERS, individual virtual servers for each CONTENT SERVER, or a mixed environment.

TABLE 8

```
wideip {
    address         111.111.111.4
    name            www.domain.com
    port            80
    pool_lbmode     topology
    pool "New York"     {
        preferred       RTT
        alternate       packet_rate
        fallback        leastconn    // if a BIG/ip
        address         111.111.111.5:80
        address         111.111.111.6:80
        address         111.111.111.7:80
    }
    pool "Los Angeles"  {
        preferred       RTT
        alternate       packet_rate
        fallback        rr
        address         111.111.112.5:80
        address         111.111.112.6:80
        address         111.111.112.7:80
    }
    pool "Tokyo"    {
        preferred       RTT
        alternate       packet_rate
        fallback        rr
        address         111.111.113.5:80
        address         111.111.113.6:80
        address         111.111.113.7:80
    }
}
topology {
// Content Source      Request Source                      Relative
                                                           Score
    pool."New York"    region."North America West Coast"   100
    pool."New York"    continent."Europe"                  100
    pool."Los Angeles" region."North America West Coast"   100
    pool."Tokyo"       region."Japan"                      100
    pool."Tokyo"       country."China"                     100
    pool."Tokyo"       continent."Australia"               100
}
```

A last-resort pool may also be defined in a Wide IP to be used when the other pools contain no available resources, regardless of the pool load-balancing mode. A last-resort pool may be used for many different reasons. For example, the last-resort pool may be used if the other pools have a flow rate that has exceeded a user defined limit or threshold. In this situation, the last-resort pool would be used until the condition dissipates. In another example, all of the other servers could be down. In this case, the last-resort pool would be used until any server resources in any other pool became available.

Figure 17:
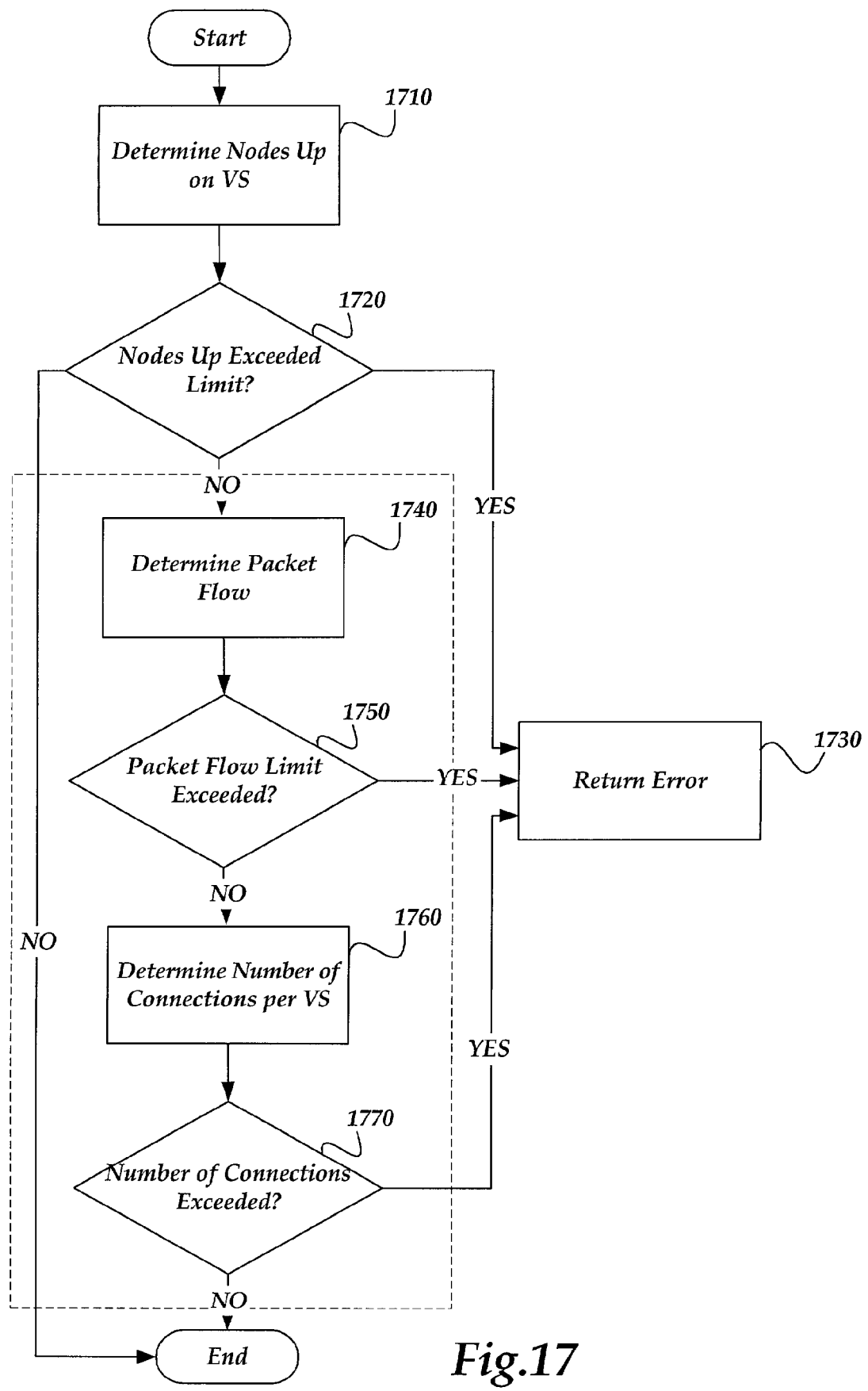
FIG. 17 illustrates a logical flow for virtual server load-balancing.

FIG. 17 illustrates a logical flow for virtual server load-balancing. Another load-balancing method, known as VSCAPACITY is included that accounts for computing power behind a wide area virtual server. This mode may take into account many different capacity variables, including: number of nodes up, packet flow, connections per VS, and the like. For example, suppose there are two sites and both sites have five servers. The load-balancing method selected is VSCAPACITY, which behaves as if the load-balancing method Ratio is selected and both sites are given the same weight of five. If two servers go down on one of the sites the ratio is automatically adjusted to compensate for the lost servers and the new ratio is three versus five.

Referring to FIG. 17, after a start block 1710, the logical flow moves to a block 1720 that determines the number of nodes up on a VS. Transitioning to a decision block, the logic determines whether the number of nodes up on a VS has exceeded a predetermined number. If so, the logical flow moves to a block 1730, at which point a value is returned indicating VSCAPACITY has been exceeded. According to one embodiment, if the number of nodes up on a VS does not exceed the predetermined number the logic steps to an end block and terminates.

According to another embodiment, if the number of nodes up on a VS does not exceed the predetermined number the logic steps, the logical flow moves to a block 1740 that determines the packet flow at the virtual server. Moving to a decision block 1750, the logical flow determines if the packet flow has exceeded a predetermined value. If so, the logical flow moves to a block 1730, at which point a value is returned indicating VSCAPACITY has been exceeded.

If not, the logic flow moves to a block 1760 that determines the number of connections per VS. Transitioning to a decision block 1770, a determination is made as to whether the number of connections per VS has exceeded a predetermined value. If so, the logical flow moves to a block 1730, at which point a value is returned indicating VSCAPACITY has been exceeded. If not, the logical flow moves to an end block, at which point the logical flow ends. The predetermined values for the above-identified VSCAPACITY variables may be set based on capabilities and availabilities of the network. Lower values will help to ensure network conditions are responsive.

Figure 18:
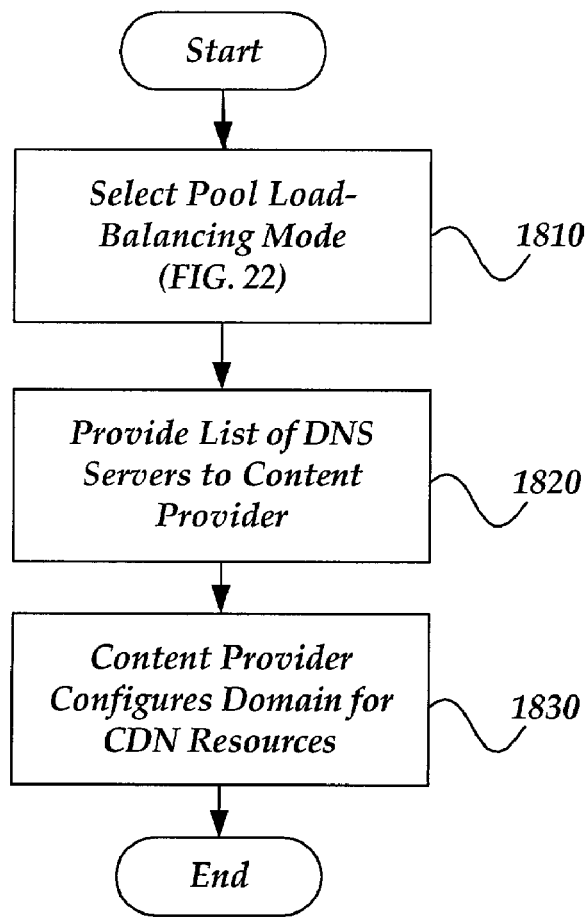
FIG. 18 illustrates a logical flow for bridging content delivery across multiple CDNs.

FIG. 18 illustrates a logical flow for bridging content delivery across multiple CDNs. According to one embodiment, the CDN administrators create the subdomain for the content provider. The subdomain includes the virtual servers that serve the content for the CDN. For example, according to one particular embodiment, equipment from F5 Networks, Inc. of Seattle, Wash., is used. According to this embodiment, virtual servers are created on BIG-IPs for the content, a Wide IP for the subdomain is added, and a pool load-balancing method, such as QOS, is selected for the newly created virtual servers.

Figure 22:
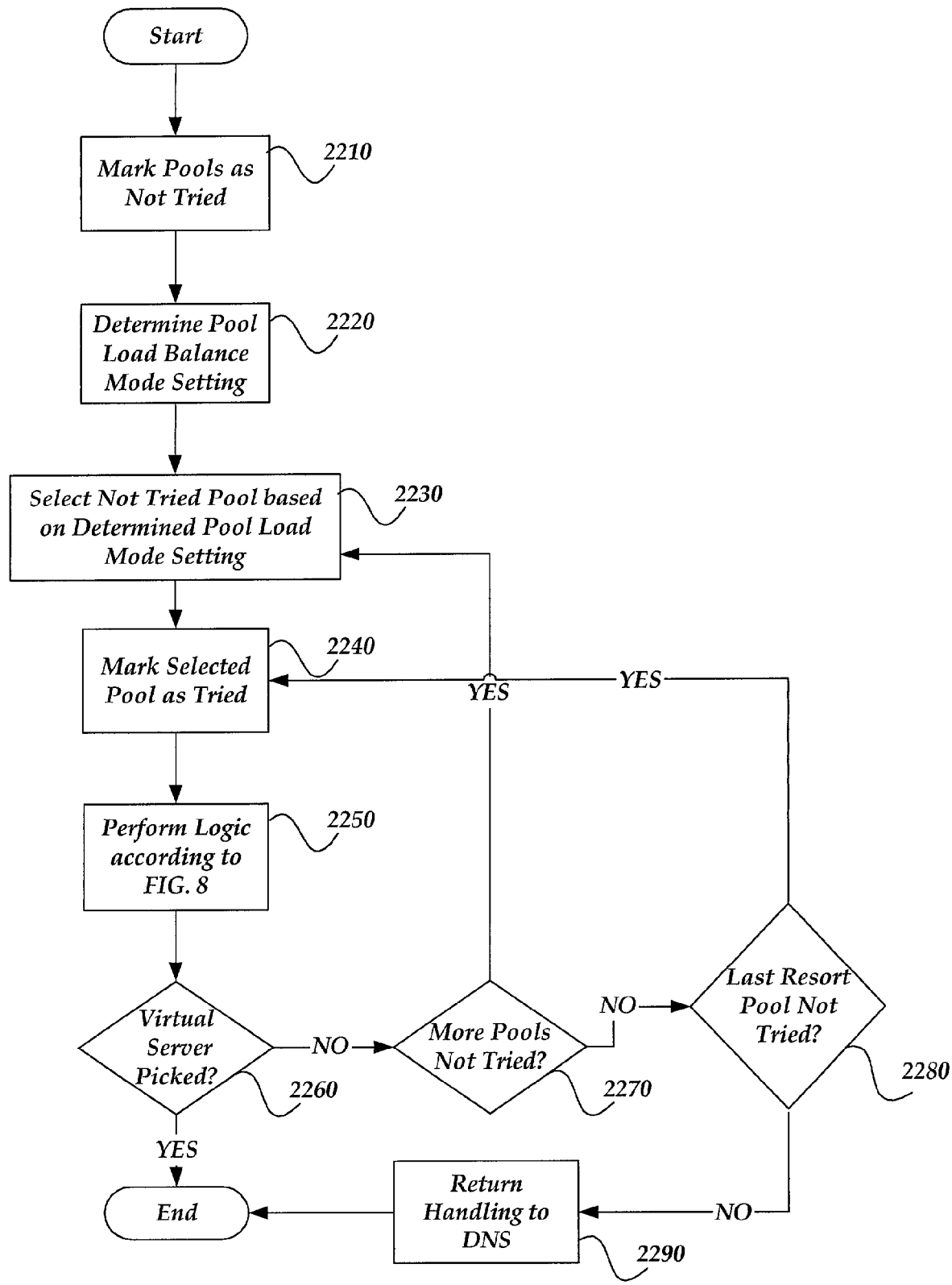
FIG. 22 illustrates a logical flow for selecting a pool.

After a start block, the logical flow moves to a block 1810, at which point the logic selects a pool load-balancing mode (See FIG. 22 and related discussion). Moving to a block 1820, the CDN provides a list of DNS servers to the content provider to delegate content delivery. Transitioning to a block 1830, the content provider configures their Wide IP for the domain with a CDN pool. The subdomain is delegated to the servers provided according to the logic of block 1810. As local DNS servers are directed to the delegation pool, they are sent to some of the CDN name servers to resolve the subdomain address, such as "www.cdn.domain.com", which directs them to CDN server resources. Content acceleration, overflow, or both may be set up.

FIG. 22 illustrates the logic for selecting a pool load-balancing mode. Beginning with a start block, the logic flows to a block 2210 that marks all of the pools as "not tried". In other words, all pools are set to an initialization state. Transitioning to a block 2220 the pool load-balancing mode setting (round robin, ratio, random, global availability, or topology) is determined. Stepping to a block 2230, according to the pool load-balancing mode setting, a pool is selected that has not been marked as "tried". Once a pool is selected, the logic steps to a block 2240 where the selected pool is marked as "tried" (block 2240). The logic as described in FIG. 8 is then used to try to get the selected pool load-balancing mode to produce an answer (block 2250). Transitioning to a decision block 2260, a decision is made as to whether the logic in block 2250 yielded one or more virtual servers. If so, then the logic flow then ends. If no virtual servers were selected in block 2250, the logic flows back to another decision block 2270 where a decision is made as to whether there are more pools in the Wide IP that have not been "tried". If there are more pools not "tried", the logic flows to back to block 2230. If all pools have been marked as "tried", then the logic flows to decision block 2280 where a determination is made whether the Wide IP contains a Last Resort Pool that has not been "tried". If so, the logic flows to block 2240. If the Wide IP does not contain a Last Resort Pool that has not been "tried", the logic flows to block 2290 where the handling of the request is returned to the DNS part of EDNS, and the logic then ends.

Figure 19:
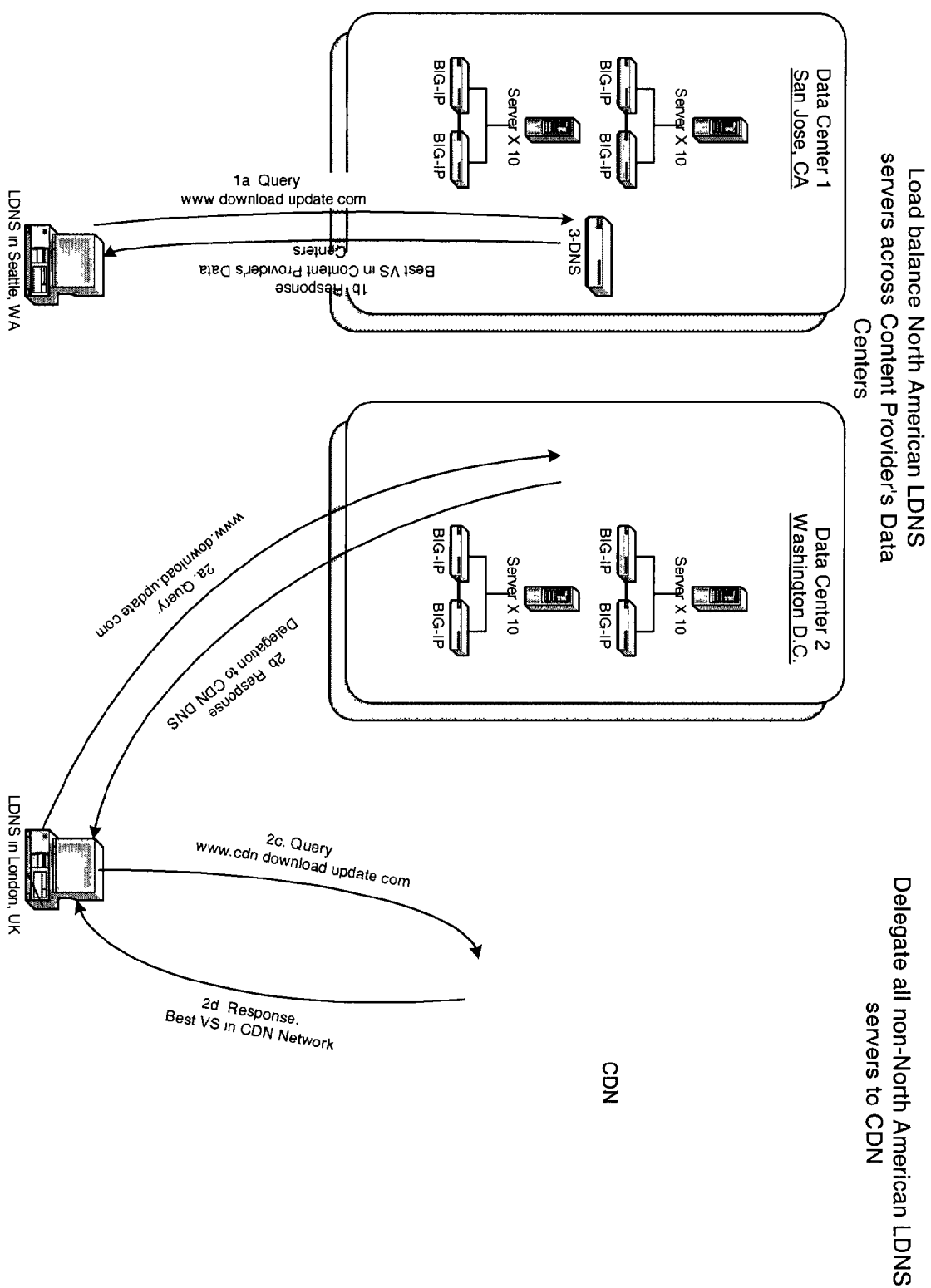
FIG. 19 illustrates a system where EDNS controllers are responding differently to local DNS servers based on their geographic attributes.

FIG. 19 illustrates a system where EDNS controllers are responding differently to local DNS servers based on their geographic attributes. A company may wish to localize traffic to predetermined data centers. For example, one data center may be located in New York, and one in Brazil. An EDNS, such as a 3-DNS from F5 Networks, Inc., may send all North American traffic to the data center in New York, and all South American traffic to the data center in Brazil. This allows users to keep in closer contact to the geographically closest data center without requiring the EDNS to collect and utilize metrics such as RTT. Generally, users in closer proximity to the data center enjoy faster service while the provider enjoys lower bandwidth costs.

Referring now to FIG. 19, the Seattle local DNS server makes a query (1a) to an EDNS server, such as a 3-DNS. The EDNS determines via topology that the content provider's origin site pool is to be used. The EDNS server returns a record in response (1b) indicating the selected server, such as a virtual server. The client then connects directly to the content provider's virtual servers.

The London local DNS server makes the same query (2a) as the local DNS server located in Seattle, Wash. The EDNS determines via topology that the CDN delegation pool is to be used. Instead of an A record response as in (1b), this query, gets a CNAME and two NS records in response (2b), follows the CNAME to query a name server in the CDN (2c), and gets an A record in response (2d) that points to a cache server. The canonical name resource record, CNAME, specifies an alias or nickname for the official, or canonical, host name. This record is associated with the alias name. Generally, it is easier to supply one A record for a given address and use CNAME records to define alias host names for that address. The Address record, or A record, lists the address for a given machine. The name field is the machine name, and the address is the network address. There is one A record for each IP address of the machine. The client then connects to the server. The CDN cache servers query for origin site virtual servers using a different domain name for cache fills (origin.download.update.com). Using a different domain name helps to ensure that the cache servers are not sent to other cache servers, which would create a caching loop. As an alternative to requiring the cache servers to use a different domain name to locate origin site servers, the EDNS may employ a region definition and topology to resolve whether the source of the request for domain name resolution is a cache server as opposed to any other local DNS server. If the source is determined to be a cache server, the EDNS may ensure that only the origin site pool is used.

TABLES 9-14 shown below illustrate exemplary configurations used to implement the exemplary embodiment as shown in FIG. 17. TABLE 9 illustrates N number of CDN DNS servers, declared as hosts with a single VS each on a specified port 53 used for delegation by the CDN. Any number of virtual servers may be listed. As will be discussed later with reference to TABLE 14, the DNS virtual servers listed under TABLE 9 are listed for delegation.

TABLE 9

```
// CDN DNS Servers
server { // datacenter=DI
      type                  host
      address               208.23.76.4
      name                  "ns1.fp.example.net"
      vs {
            address                 111.11.11:53 // dns
            probe_protocol dns_rev
      }
}
server { // datacenter=DI
      type                  host
      address               111.121.131
      name                  "ns2.fp.example.net"
      vs {
            address                 105.111.111.11:53 // dns
            probe_protocol dns_rev
      }
}
...
server { // datacenter=DI
      type                  host
      address               111.222.111.111
      name                  "ns9.fp.example.net"
      vs {
            address                 111.121.131.111:53 // dns
            probe_protocol dns_rev
      }
}
```

TABLE 10 lists an exemplary SAC configuration file used by the content provider. In this particular example, 4 pairs of SACs, such as BIG-Ips from F5, Inc. of Seattle, Wash. are shown. Each pair of SACs manages a single VS for the content. Each SAC may include a KBPS limit for each VS.

TABLE 10

```
// Content Provider SAC's
server { // datacenter= SanJose
      type            bigip
      address         111.11.111.22
      name            "SanJose"
      interface {
            address 111.11.111.23
            address 111.11.111.24
      }
      vs {
            address             111.11.111.30:80 // http
            limit {
                  kbytes_per_sec 11000
            }
      }
}
```

Figure 20:
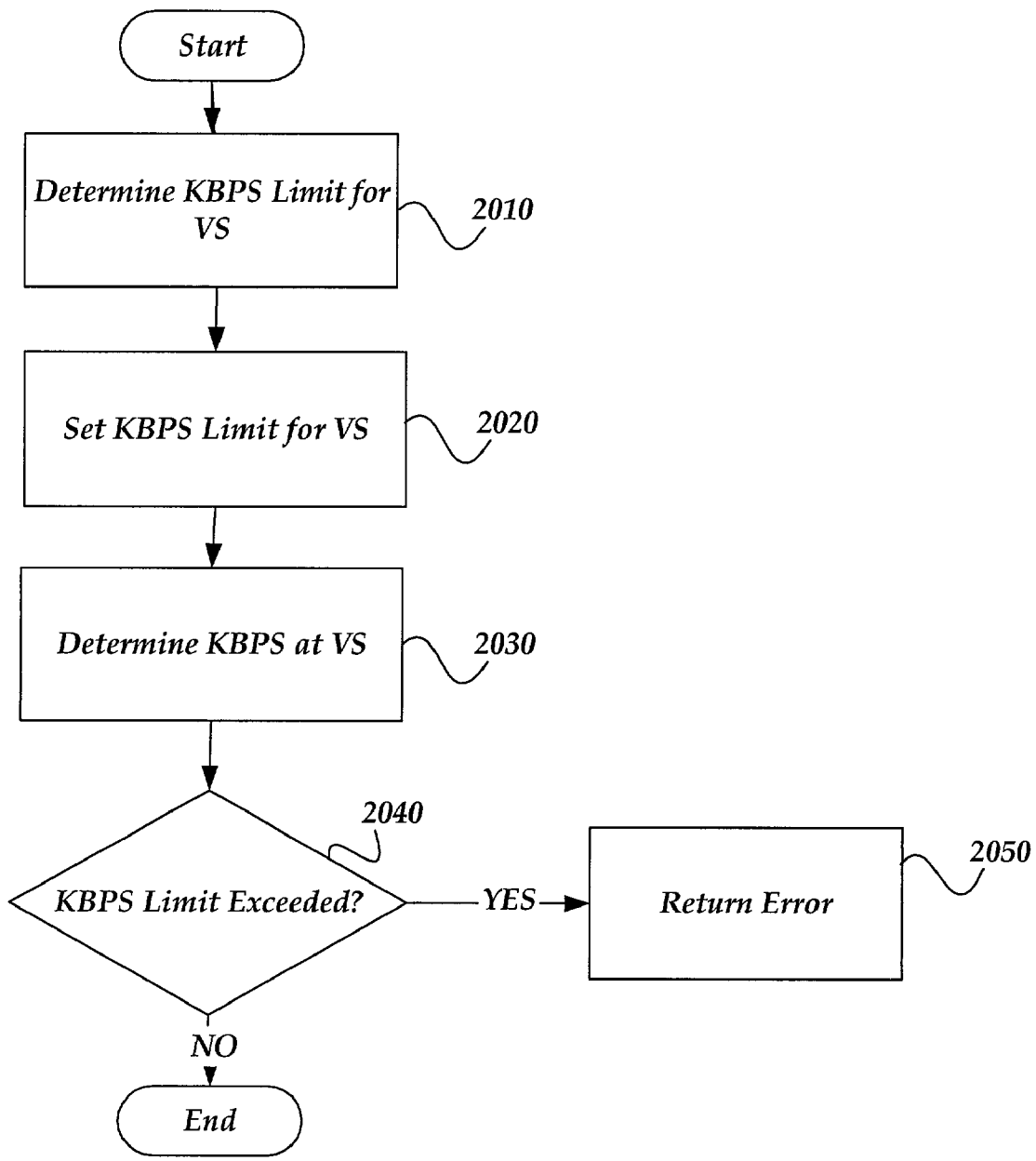
FIG. 20 illustrates the logical flow for setting and determining when a KBPS limit has been exceeded.

FIG. 20 illustrates the logical flow for setting and determining when a KBPS limit has been exceeded. After a start block, a KBPS limit is determined for the VS (block 2010). The KBPS limit may be adjusted based on the capacity and connectivity of the data centers. For example, if a data center has more capacity or better connectivity the listed virtual servers may have a higher KBPS limit than other data centers not having the same capacity or connectivity. According to one embodiment of the invention, the KBPS could be automatically selected based on current server performance. For example, suppose the Washington D.C. data center has more capacity and better connectivity than the San Jose, Calif. data center, then the virtual servers associated with the Washington D.C. data center have slightly higher limits on KBPS than the San Jose virtual servers. Stepping to a block 2020, the KBPS limit is set at the VS. Transitioning to a block 2030, a determination is made as to KBPS at the VS. Transitioning to a decision block 2040, a determination is made as to whether the predetermined KBPS limit has been exceeded by the VS. If so, the logical flow moves to a block 2050 at which point the logic returns a value indicating the KBPS limit has been exceeded by the VS. If not, the logical flow ends.

TABLE 11 illustrates a Wide IP that the CDN caches use to locate an origin site VS for cache fills. The CDN caches map www.cdn.download.update.com to origin.cdn.download.update.com.

In an alternative embodiment, a mapping on their caches for each domain (i.e. each content provider) and a separate Wide IP to locate the origin site is not used. Instead, a single Wide IP as illustrated in TABLE 11 with an extra topology statement mapping caches in the CDN (as the local DNS servers) to the origin site pool is used.

According to one embodiment, all client local DNS server regardless of geography use the exemplary Wide IP statement. This helps to ensure that each local DNS server gets the same content, same hyperlinks, and the same URLs. There are several settings in the Wide IP configuration to help achieve the desired traffic distributions, which are discussed below.

TABLE 11

```
// Wide IPs
wideip {
    address        111.111.1.111
    port           80 // http
    ttl            30
    name           "origin.download.update.com"
    alias          "download.update.com"
    pool_lbmode    ga
    pool {
        name             "First Pool"
        dynamic_ratio    yes
        preferred        rtt
        alternate        packet_rate
        fallback         rr
        address          111.11.111.80
        address          111.11.111.81
        address          112.111.1.145
        address          112.111.1.146
    }
}
wideip {
    address        111.111.0.2
    port           80 // http
    ttl            10
    name           "www.download.update.com"
    alias          "www.cdn.download.update.com"
    pool_lbmode    topology
    pool {
        name             "Content Provider"
        dynamic_ratio    yes
        preferred        rtt
        alternate        packet_rate
        fallback         rr
        address          111.11.111.80
        address          111.11.111.81
        address          112.111.1.145
        address          112.111.1.146
    }
    pool {
        name             "CDN Pool"
        type             NS
        ttl              60
        cname            "www.cdn.download.update.com"
        zname            "cdn.download.update.com"
        preferred        rr
        fallback         null
        address          11.111.111.111:53
        address          111.11.11:53
        address          111.11.11:53
```

TABLE 11-continued

```
        address          111.111.111.111:53
        address          111.111.111.120:53
        address          222.111.111.11:53
        address          223.111.111.111:53
        address          224.11.11.1:53
        address          225.11.11.1:53
    }
}
```

A TTL value may be set at the pool level. According to one embodiment, when the TTL value is omitted, the TTL Wide IP value is used as the default. In the above example, the local DNS servers cache records to the content provider virtual servers for 10 seconds, but cache the CNAME records (and thus the delegation to the CDN) for 60 seconds. The lower the TTL value for the A records provides the EDNS the opportunity to load balance with more granularity among virtual servers it is monitoring. The higher TTL value for the delegation phase is appropriate because an EDNS can't see performance details of the CDN virtual servers. However, the higher TTL value for the delegation phase can be set reasonably low to enable the content provider to quickly shift traffic from one CDN to another, or from a CDN back to the content provider's origin site.

The traffic management within the CDN is entirely delegated to the CDN name servers, and conditions within the CDN helping to enable the EDNS to make a comparison between the CDN and the origin site of quality of service to the client are not readily available. In one embodiment of the invention, static criteria such as topology mappings are used to determine which clients are delegated to the CDN. According to another embodiment, the CDN DNS servers provide metrics to the EDNS that it uses to make a dynamic determination of which clients should be delegated to the CDN in order to optimize for quality of service.

The exemplary virtual servers in the content providers pool refer to content provider's data centers in San Jose, Calif., or Washington D.C. If the content provider's pool is chosen (the local DNS server is North American, via pool_lbmode topology), then the local DNS server is load balanced to the closest data center using path metrics. Dynamic ratio makes sure requests are spread across virtual servers in the same pool in proportion to the dynamic metrics values. As discussed above, limits on KBPS are set in the VS definitions, which help create an Insurance/Overflow to occur when the origin site gets too busy.

The CDN delegation pool contains virtual servers that are in fact CDN DNS servers. If this pool is chosen via pool lbmode topology, or because all virtual servers in the content provider pool are unavailable, due to KBPS limits for example, then the EDNS answers the query not with an A record but with a CNAME and 2 or more NS records. Since the EDNS is monitoring the virtual servers for availability, it only delegates a local DNS server to a DNS that is available. According to one embodiment, the EDNS only determines about each DNS VS whether it is available, so a static load-balancing mode is used. Fallback is NULL rather than the default RETURN TO DNS because if all the CDN DNSes are unavailable, the local DNS server is sent to the content provider's origin site pool rather than just returning query handling to the underlying DNS.

According to one embodiment of the invention, a simplified topology is provided. Customers no longer need to gather thousands of IP subnets that describe regions of interest.

Instead, a simple topology statement may be used. For example, the following 2-line topology statement shown in TABLE 12 may be used.

TABLE 12

```
////////////////////////////////////////////
// Topology
topology {
    pool."Content Provider"   cont."North America"    100
    pool."CDN"                !cont." North America"  100
}
```

The delegation pool contains virtual servers that may point to DNSes as well as content servers. The ability to point to virtual servers, instead of just content servers helps to simplify integrating the delegation feature into existing DNS configurations. According to one actual embodiment of the invention, the integration has been performed into the 3-DNS system of F5 Networks, Inc. of Seattle, Wash. However, this method creates some repetitive, verbose configuration files. Furthermore, having to declare and then select all the CDN name servers as virtual servers in pools is cumbersome.

For example, in a CDN environment, each content provider has its own Wide IP. These Wide IP statements may be manually created by configuring the delegation to a CDN, or created through an automatic process. Repetitive manual tasks are prone to error; however, and therefore it is preferable to automatically configure the delegation to a CDN.

According to one embodiment of the invention, host statements for each CDN are placed into a cdn object. The cdn object may then be listed as a pool member. TABLE 13 shows an exemplary cdn object. The created cdn objects may be included in the configuration directly, or via an include mechanism which encapsulates the cdn object definitions. The following is an example for cdn definition:

TABLE 13

```
////////////////////////////////////////////
// Example DNS Servers
cdn {
    name "CDN Example"
    dns {
        name      "xx1.yy.example.net"
        address   11.111.111.111:53
    }
    dns {
        name      "xx2.yy.example.net"
        address   111.11.11.11:53
    }
    ...
        name      "xxN.yy.example.net"
        address   111.111.111.111:53
    }
}
```

Referring now to the cdn object definition, a name is defined for the cdn object. DNSes available for the cdn are listed. The number of DNSes is unlimited for the cdn, though only 16 can be included in a DNS query response at a given time due to current limitations in the DNS protocol. According to one embodiment of the present invention, the cdn object definitions may effectively replace the CDN DNS servers as illustrated in FIG. 7. For example, the defined cdn objects may be included as an include file in the Wide IP.

According to one embodiment of the present invention, additional cdn objects are included for all the major CDN providers in an include file. End users may also create their own cdn object definitions. According to one embodiment, these object definitions are integrated into releases of new EDNS upgrades.

Similarly, in an alternative embodiment, an EDNS administrator may delegate some or all traffic to a CDN by listing the cdn as a pool member. TABLE 14 illustrates a cdn object as a pool member.

TABLE 14

```
pool {
    name    "CDN Pool"
    type    CDN
    ttl     60
    name    "www.cdn.download.update.com"
    zname   "cdn.download.update.com"
    cdn     "CDN"
}
```

The contents of TABLE 14 may effectively replace the delegation pool as illustrated in TABLE 11. According to one embodiment of the invention, when a pool is CDN type, the pool includes values for: TTL, a cdn, a cname, and a zname. Name servers in each cdn object will be monitored for availability by the EDNS only when the cdn object is mentioned in one or more pools, avoiding excessive and non-useful monitoring network traffic.

Figure 21:
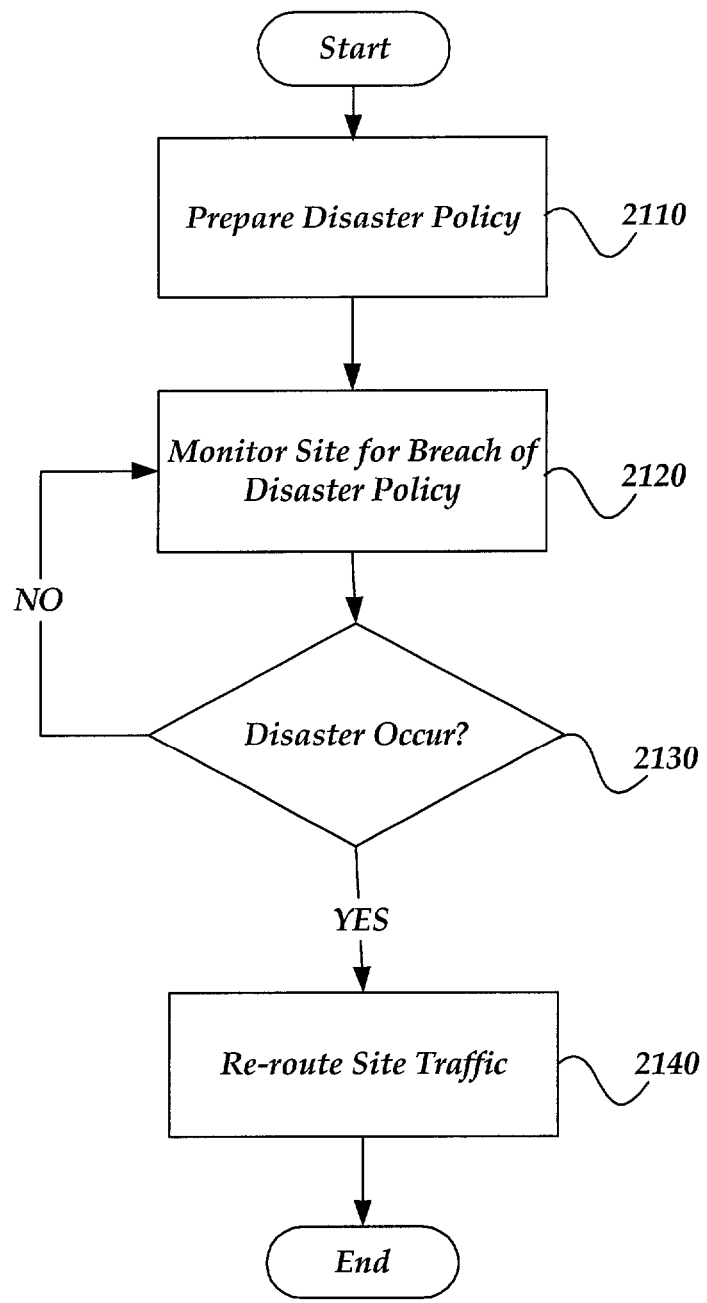
FIG. 21 illustrates a logical flow for handling disaster recovery for a site.

FIG. 21 illustrates a logical flow for handling disaster recovery for a site. After a start block, the logical flow moves to a block 2110 that determines the disaster recovery policy. The policy may be set on many different parameters. For example, a policy can be set that specifies that all traffic be sent to the primary site, but only if it is performing correctly. If not, traffic can be immediately directed to a backup site. For example, an institution may have both a primary site, and a backup site that can serve content. Moving to a block 2120 the site is monitored for breach of the disaster policy. Transitioning to a decision block 2130, a determination is made as to if a disaster has occurred. If so, the logical flow moves to a block 2140 at which point the site traffic is rerouted based on the disaster policy. If not, the logical flow returns to block 2120 for further monitoring. The logical flow then ends.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of delivering content across a plurality of zones within a network, comprising:

receiving a request from a client located within one of the plurality of zones for access to resources associated with a domain name;

determining network conditions for the network based on a determination of the load for each of the plurality of zones;

distributing the request to one of the plurality of zones based on the determined network conditions;

selecting one of a plurality of servers within the zone in which the request was distributed, the selection of the server being based on a determination for optimally balancing the load across the plurality of servers;

resolving an Internet protocol (IP) address of the selected server; and determining whether to delegate delivery of the resources to a content delivery network based on the determination for optimally balancing the load across the plurality of servers, a Time to Live value set at a pool level for each of a plurality of available pools, and a pool load-balancing setting;
wherein selecting one of the plurality of servers further comprises: marking each of a plurality of pools to a not tried state, determining the pool load-balancing setting, selecting one of the plurality of pools that is marked to an initialization state, marking the selected one of the plurality of pools to a tried state, attempting to obtain an answer using the determined pool load-balancing on the selected one of the plurality of pools, and determining if the answer was obtained.

2. The method of claim 1, further comprising querying a local Domain Name System (DNS) to provide the IP address associated with the domain name.

3. The method of claim 2 wherein when the IP address is not present at the local DNS, querying a primary DNS to resolve the IP address associated with the domain name.

4. The method of claim 3, wherein when the primary DNS determines the domain name is delegated to a EDNS, further comprises referring the local DNS to the EDNS to resolve the IP address for the selected server, the EDNS employs at least one of a plurality of load balancing determinations to select one of the plurality of servers and resolve the IP address for the selected server.

5. The method of claim 4 wherein selecting one of the plurality of servers, further comprises accounting for computing power behind a wide area virtual server.

6. The method of claim 1, further comprising:
deriving cost metrics for network paths in topological maps;
using the cost metrics to determine a geographic location of the request; and
distributing the request based on the geographic location.

7. The method of claim 1, further comprising:
using a last hop address to determine a geographic location of the request; and
distributing the request based on the geographic location.

8. The method of claim 1, further comprising using a last-resort pool to select the server.

9. The method of claim 1, wherein at least a portion of the plurality of servers are virtual servers.

10. The method of claim 9 wherein selecting one of the plurality of servers within the zone in which the request was distributed, the selection of the server being based on a determination for optimally balancing the load across the plurality of servers, further comprising:
determining if the selected server is a virtual server, and if so:
determining a number of nodes up on the virtual server;
determining if the number of nodes up or the number of connections for the virtual server exceeds a predetermined number and if so returning a value indicating the capacity of the virtual server has been exceeded.

11. A system for balancing the load on a plurality of virtual servers that provide access to resources associated with a domain name, comprising:
a memory for storing logical instructions; and
a processor for executing the logical instructions stored in the memory, the execution of the logical instructions causing functions to be performed, including:
receiving a request from a client located within one of the plurality of zones for access to resources associated with a domain name through an authoritative server;
determining network conditions for the network based on a determination of the load for each of the plurality of zones;
distributing the request to one of the plurality of zones based on the determined network conditions;
selecting one of the plurality of servers within the zone in which the request was distributed, the selection of the server being based on a determination for optimally balancing the load across the plurality of servers;
resolving an Internet protocol (IP) address of the selected server; and
determining whether to delegate delivery of the resources to a content delivery network based on the determination for optimally balancing the load, wherein the determination of whether to delegate delivery is made prior to a connection of the client to the content delivery network if the delivery of resources is delegated to a delegation pool associated with the content delivery network;
wherein selecting one of the plurality of servers further comprises: marking each of a plurality of pools to a not tried state, determining the pool load-balancing setting, selecting one of the plurality of pools that is marked to an initialization state, marking the selected one of the plurality of pools to a tried state, attempting to obtain an answer using the determined pool load-balancing on the selected one of the plurality of pools, and determining if the answer was obtained.

12. The system of claim 11, wherein selecting one of the plurality of servers, further comprises choosing the server based on one of a plurality of static load balancing determinations for each server, the plurality of static load balancing determinations being selectable and including random, round robin, static ratio, global availability and topology.

13. The system of claim 11 wherein selecting one of the plurality of servers, further comprises choosing the server based on one of a plurality of dynamic load balancing determinations for each server, the dynamic load balancing determinations being selectable and including completion rate, least connections, packet rate, hops, round trip times, new connection rate, kilobyte rate, quality of service and dynamic ratio.

14. The system of claim 11 wherein selecting one of the plurality of servers, further comprises accounting for computing power behind a wide area virtual server.

15. The system of claim 11, further comprising distributing the request to a closest server based on a closest identified geographic CONTENT-SERVER or a best-performing CONTENT-SERVER, or a best quality path.

16. The system of claim 11, further comprising:
deriving cost metrics for network paths in topological maps;
using the cost metrics to determine a geographic location of the request; and
distributing the request based on the geographic location.

17. The system of claim 11, further comprising:
using a last hop address to determine a geographic location of the request; and
distributing the request based on the geographic location.

18. The system of claim 11, further comprising using a last-resort pool to select the server.

19. The system of claim 11 wherein at least a portion of the plurality of servers are virtual servers.

20. The system of claim 19 wherein selecting one of the plurality of servers within the zone in which the request was distributed, the selection of the server being based on a determination for optimally balancing the load across the plurality of servers further comprising:

determining if the selected server is a virtual server, and if so:

determining a number of nodes up on the virtual server;

determining if the number of nodes up or the number of connections for the virtual server exceeds a predetermined number and if so returning a value indicating the capacity of the virtual server has been exceeded.

21. A system for delivering content across a plurality of zones within a network, comprising:

a processor that includes:

a receiver that receives a request from a client located within one of the plurality of zones to access resources associated with a domain name;

a means for distributing the request to one of the plurality of zones based on network conditions of the plurality of zones;

a load balancer that selects one of a plurality of servers within the zone in which the request is distributed;

a system component that resolves an Internet protocol (IP) address of the selected server;

a means for determining whether to delegate delivery of the resources to a content delivery network based on a load balancing determination for optimally balancing the load across the plurality of servers or the content delivery network, wherein the plurality of servers and the content delivery network are designated members of different delegation pools of content sources; and a means for selecting one of the plurality of servers comprising marking each of a plurality of pools to a not tried state, determining the pool load-balancing setting, selecting one of the plurality of pools that is marked to an initialization state, marking the selected one of the plurality of pools to a tried state, attempting to obtain an answer using the determined pool load-balancing on the selected one of the plurality of pools, and determining if the answer was obtained.

22. A method for delivering content over a network, comprising:

receiving a request from a client for access to resources associated with a domain name;

distributing the request to one of a plurality of zones based at least in part on network conditions associated with the zones, wherein distributing the request includes determining whether to delegate delivery of the resources to a content delivery network;

selecting one of a plurality of servers within the zone in which the request is distributed, wherein selecting the server is based at least in part on a balancing of the load among the servers;

resolving the domain name into an Internet protocol (IP) address of the selected server; and determining whether to delegate, in a controlled manner, delivery of the resources to a content delivery network or to an origin site based on the balancing of the load and a mapping created between pools of content sources and an identified physical geographic location of an IP address of the request;

wherein selecting one of the plurality of servers further comprises: marking each of a plurality of pools to a not tried state, determining the pool load-balancing setting, selecting one of the plurality of pools that is marked to an initialization state, marking the selected one of the plurality of pools to a tried state, attempting to obtain an answer using the determined pool load-balancing on the selected one of the plurality of pools, and determining if the answer was obtained.

\* \* \* \* \*

UNITED STATES PATENT AND TRADEMARK OFFICE
CERTIFICATE OF CORRECTION

| | | |
|---|---|---|
| PATENT NO. | : 7,441,045 B2 | Page 1 of 2 |
| APPLICATION NO. | : 09/788281 | |
| DATED | : October 21, 2008 | |
| INVENTOR(S) | : Bryan D. Skene et al. | |

It is certified that error appears in the above-identified patent and that said Letters Patent is hereby corrected as shown below:

In Sheet 4 of 28, in FIG. 3B, Reference Numeral 126, line 2, delete "DATACENTER" and insert -- DATA CENTER --, therefor.

In Sheet 5 of 28, in FIG. 3C, Reference Numeral 126, line 2, delete "DATACENTER" and insert -- DATA CENTER --, therefor.

In Sheet 18 of 28, in FIG. 11, Reference Numeral 336, line 1, delete "ROUNDROBIN?" and insert -- ROUND ROBIN? --, therefor.

In Sheet 18 of 28, in FIG. 11, Reference Numeral 338, line 3, delete "ROUNDROBIN" and insert -- ROUND ROBIN --, therefor.

In Sheet 28 of 28, in FIG. 22, Reference Numeral 2280, line 1, delete "Last Resort" and insert -- Last-Resort --, therefor.

In column 9, line 19, delete "it)" and insert -- it --, therefor.

In column 15, line 58, delete "C" and insert -- 0 --, therefor.

In column 15, line 65, delete "QOS)VS)" and insert -- QOS (VS) --, therefor.

In column 23, line 30, delete "a" and insert -- A --, therefor.

In column 24, line 33, delete "BIG-Ips" and insert -- BIG-IPs --, therefor.

UNITED STATES PATENT AND TRADEMARK OFFICE
CERTIFICATE OF CORRECTION

PATENT NO. : 7,441,045 B2
APPLICATION NO. : 09/788281
DATED : October 21, 2008
INVENTOR(S) : Bryan D. Skene et al.

It is certified that error appears in the above-identified patent and that said Letters Patent is hereby corrected as shown below:

In column 26, line 51-52, delete "pool lbmode" and insert -- pool_lbmode --, therefor.

Signed and Sealed this

Third Day of February, 2009

JOHN DOLL
*Acting Director of the United States Patent and Trademark Office*